US012498002B2

(12) United States Patent
Kobayashi et al.

(10) Patent No.: US 12,498,002 B2
(45) Date of Patent: Dec. 16, 2025

(54) CLUTCH DEVICE

(71) Applicant: Kabushiki Kaisha F.C.C., Hamamatsu (JP)

(72) Inventors: Yuki Kobayashi, Hamamatsu (JP); Takayuki Suzuki, Hamamatsu (JP); Takayoshi Mimuro, Hamamatsu (JP); Jun Komukai, Hamamatsu (JP); Yasunori Higashi, Hamamatsu (JP); Makoto Kambara, Hamamatsu (JP); Satoshi Ota, Hamamatsu (JP); Yukinori Kurita, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/224,627

(22) Filed: Jul. 21, 2023

(65) Prior Publication Data
US 2024/0026935 A1    Jan. 25, 2024

(30) Foreign Application Priority Data

Jul. 21, 2022 (JP) ................... 2022-116636
Dec. 7, 2022 (JP) ................... 2022-195700

(51) Int. Cl.
F16D 23/12 (2006.01)
F16D 13/56 (2006.01)
(Continued)

(52) U.S. Cl.
CPC ............. *F16D 23/12* (2013.01); *F16D 13/56* (2013.01); *F16D 13/70* (2013.01); *F16D 13/52* (2013.01);
(Continued)

(58) Field of Classification Search
CPC ..... F16D 2023/123; F16D 13/70; F16D 13/74
See application file for complete search history.

(56) References Cited

U.S. PATENT DOCUMENTS

2014/0326570 A1    11/2014  Isobe et al.
2014/0353108 A1    12/2014  Tokumoto
(Continued)

FOREIGN PATENT DOCUMENTS

CN    207161563 U    3/2018
EP    3653897 A1     5/2020
(Continued)

OTHER PUBLICATIONS

Kobayashi et al., "Clutch Device", U.S. Appl. No. 18/224,630, filed Jul. 21, 2023.

*Primary Examiner* — Stacey A Fluhart
(74) *Attorney, Agent, or Firm* — Keating & Bennett, LLP

(57) ABSTRACT

A clutch device includes a pressure plate movable toward or away from a clutch center and rotatable relative to the clutch center to press input-side rotating plates and output-side rotating plates. The clutch center includes center-side cam portions each including a center-side assist cam surface. At least one of the center-side cam portions includes at least one of a first center-side recess recessed in a first direction from a surface of center-side cam portion at a side of a second direction or a second center-side recess recessed in the second direction from a surface of the center-side cam portion at a side of the first direction.

20 Claims, 20 Drawing Sheets

(51) Int. Cl.
*F16D 13/70* (2006.01)
*F16D 13/52* (2006.01)

(52) U.S. Cl.
CPC .. *F16D 2013/565* (2013.01); *F16D 2023/123* (2013.01)

(56) References Cited

U.S. PATENT DOCUMENTS

| | | | |
|---|---|---|---|
| 2015/0041275 A1 | 2/2015 | Satou et al. | |
| 2017/0159725 A1 | 6/2017 | Imanishi | |
| 2019/0285125 A1* | 9/2019 | Imanishi | F16D 13/52 |
| 2020/0158194 A1 | 5/2020 | Kataoka et al. | |
| 2020/0232520 A1 | 7/2020 | Ozawa et al. | |
| 2020/0340537 A1* | 10/2020 | Nishikawa | F16D 13/52 |
| 2021/0033154 A1 | 2/2021 | Isobe et al. | |
| 2021/0285510 A1 | 9/2021 | Ozawa et al. | |
| 2021/0356000 A1 | 11/2021 | Ozawa et al. | |
| 2023/0272825 A1* | 8/2023 | Ozawa | F16D 13/56 192/70.12 |
| 2023/0279908 A1 | 9/2023 | Ozawa et al. | |

FOREIGN PATENT DOCUMENTS

| | | | |
|---|---|---|---|
| JP | 2013137039 A | 7/2013 | |
| JP | 2014234885 A | 12/2014 | |
| JP | 5847551 B2 | 1/2016 | |
| JP | 2017-101811 A | 6/2017 | |
| JP | 2019027483 A | 2/2019 | |
| JP | 2019044870 A | 3/2019 | |
| JP | 2019-120393 A | 7/2019 | |
| JP | 2019158087 A | 9/2019 | |
| JP | 2020-090988 A | 6/2020 | |
| JP | 2020090989 A | 6/2020 | |
| WO | 2018/172176 A1 | 9/2018 | |
| WO | WO-2020116508 A1 * | 6/2020 | B60K 17/02 |
| WO | 2021186293 A1 | 9/2021 | |
| WO | 2022030350 A1 | 2/2022 | |

* cited by examiner

CLUTCH DEVICE

CROSS REFERENCE TO RELATED APPLICATIONS

This application claims the benefit of priority to Japanese Patent No. 2022-116636 filed on Jul. 21, 2022 and Japanese Patent No. 2022-195700 filed on Dec. 7, 2022. The entire contents of these applications are hereby incorporated herein by reference.

BACKGROUND OF THE INVENTION

1. Field of the Invention

The present disclosure relates to a clutch device. More particularly, the present disclosure relates to a clutch device that arbitrarily allows or interrupts transfer of a rotation driving force of an input shaft, which is rotationally driven by a prime mover such as an engine, to an output shaft.

2. Description of the Related Art

Conventional vehicles such as motorcycles include clutch devices. A clutch device is disposed between an engine and a drive wheel and allows or interrupts transfer of a rotation driving force of the engine to the drive wheel. The clutch device generally includes a plurality of input-side rotating plates that rotate by a rotation driving force of an engine and a plurality of output-side rotating plates connected to an output shaft that transfers the rotation driving force to a drive wheel. The input-side rotating plates and the output-side rotating plates are alternately arranged in a stacking direction, and the input-side rotating plates and the output-side rotating plates are brought into pressure contact with each other and are separated from each other so that transfer of a rotation driving force is allowed or interrupted.

Japanese Patent No. 5847551 and International Patent Publication No. 2018/172176, for example, disclose clutch devices each including a clutch center (clutch member) that holds output-side rotating plates (driven-side clutch plates), and a pressure plate (pressure member) movable toward or away from the clutch center. The pressure plate is configured to press the input-side rotating plates and the output-side rotating plates. In this manner, the clutch device includes an assembly of the clutch center and the pressure plate.

A clutch center and a pressure plate of each of the clutch devices described in Japanese Patent No. 5847551 and International Patent Publication No. 2018/172176 include an assist cam surface that generates a force in a direction of causing the pressure plate to approach the clutch center in a state where a rotation driving force of an engine can be transferred to an output shaft, to increase a pressing force between input-side rotating plates and output-side rotating plates, and a slipper cam surface that moves the pressure plate away from the clutch center to reduce a pressing force between the input-side rotating plates and the output-side rotating plates when the rotation speed of the clutch center exceeds the rotation speed of the pressure plate.

Cam portions of the clutch center and the pressure plate including the assist cam surface and the slipper cam surface are relatively thick. Thus, as the cam portions become large, the weight thereof increases, resulting in a problem of an increase in the weight of the entire clutch device. Since the clutch device is mounted on a vehicle such as a motorcycle, the clutch device is preferably relatively lightweight.

SUMMARY OF THE INVENTION

Preferred embodiments of the present disclosure provide clutch devices each capable of achieving weight reduction of cam portions including an assist cam surface and a slipper cam surface in at least one of a clutch center or a pressure plate.

A clutch device according to a preferred embodiment of the present disclosure is a clutch device to allow or interrupt transfer of a rotation driving force of an input shaft, and includes a clutch center housed in a clutch housing holding a plurality of input-side rotating plates, holding a plurality of output-side rotating plates alternately arranged with the input-side rotating plates, and operable to be rotationally driven together with the output shaft, the input-side rotating plates being operable to be rotationally driven by rotational driving of the input shaft, and a pressure plate movable toward or away from the clutch center and rotatable relative to the clutch center to press the input-side rotating plates and the output-side rotating plates. The clutch center includes an output shaft holding portion to which the output shaft is coupled, and a plurality of center-side cam portions located radially outward of the output shaft holding portion and each including a center-side assist cam surface operable to generate a force in a direction of causing the pressure plate to approach the clutch center in order to increase a pressing force between the input-side rotating plates and the output-side rotating plates upon rotation relative to the pressure plate. Assuming a direction in which the pressure plate approaches the clutch center is a first direction, and a direction in which the pressure plate moves away from the clutch center is a second direction, at least one of the center-side cam portions includes at least one of a first center-side recess or a second center-side recess, the first center-side recess being recessed in the first direction from a surface of the center-side cam portion at a side of the second direction, the second center-side recess being recessed in the second direction from a surface of the center-side cam portion at a side of the first direction.

In a clutch device according to a preferred embodiment of the present disclosure, at least one of the center-side cam portions includes at least one of the first center-side recess that is recessed in the first direction from the surface of the center-side cam portion at the side of the second direction or the second center-side recess that is recessed in the second direction from the surface of the center-side cam portion at the side of the first direction. In this manner, since at least one of the center-side cam portions includes at least one of the first center-side recess or the second center-side recess, the center-side cam portions are more lightweight than those not including these recesses. Since the clutch device includes the more lightweight clutch center, weight reduction of the entire clutch device is achieved.

A clutch device according to another preferred embodiment of the present disclosure is a clutch device to allow or interrupt transfer of a rotation driving force of an input shaft, and includes a clutch center housed in a clutch housing holding a plurality of input-side rotating plates, holding a plurality of output-side rotating plates alternately arranged with the input-side rotating plates, and operable to be rotationally driven together with the output shaft, the input-side rotating plates being operable to be rotationally driven by rotational driving of the input shaft, and a pressure plate movable toward or away from the clutch center and rotatable relative to the clutch center to press the input-side rotating plates and the output-side rotating plates. The pressure plate includes a plurality of pressure-side cam portions located radially outward of the output shaft and each including a pressure-side assist cam surface operable to generate a force in a direction of causing the pressure plate to approach the clutch center in order to increase a pressing force between the input-side rotating plates and the output-side rotating plates upon rotation relative to the clutch center. Assuming a direction in which the pressure plate approaches the clutch center is a first direction, and a direction in which the pressure plate moves away from the clutch center is a second direction, at least one of the pressure-side cam portions includes at least one of a first pressure-side recess or a second pressure-side recess, the first pressure-side recess being recessed in the second direction from a surface of the pressure-side cam portion at a side of the first direction, the second pressure-side recess being recessed in the first direction from a surface of the pressure-side cam portion at a side of the second direction, and when seen in an axial direction of the output shaft, at least a portion of the first pressure-side recess overlaps with the pressure-side assist cam surface.

In a clutch device according to a preferred embodiment of the present disclosure, at least one of the pressure-side cam portions includes the first pressure-side recess that is recessed in the second direction from the surface of the pressure-side cam portion at the side of the first direction or the second pressure-side recess that is recessed in the first direction from the surface of the pressure-side cam portion at the side of the second direction. In this manner, since at least one of the pressure-side cam portions includes at least one of the first pressure-side recess or the second pressure-side recess, the pressure-side cam portions are more lightweight than those not including these recesses. Since the clutch device includes the more lightweight pressure plate, weight reduction of the entire clutch device is achieved.

Preferred embodiments of the present disclosure provide clutch devices each capable of achieving weight reduction of cam portions including an assist cam surface and a slipper cam surface in at least one of a clutch center or a pressure plate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
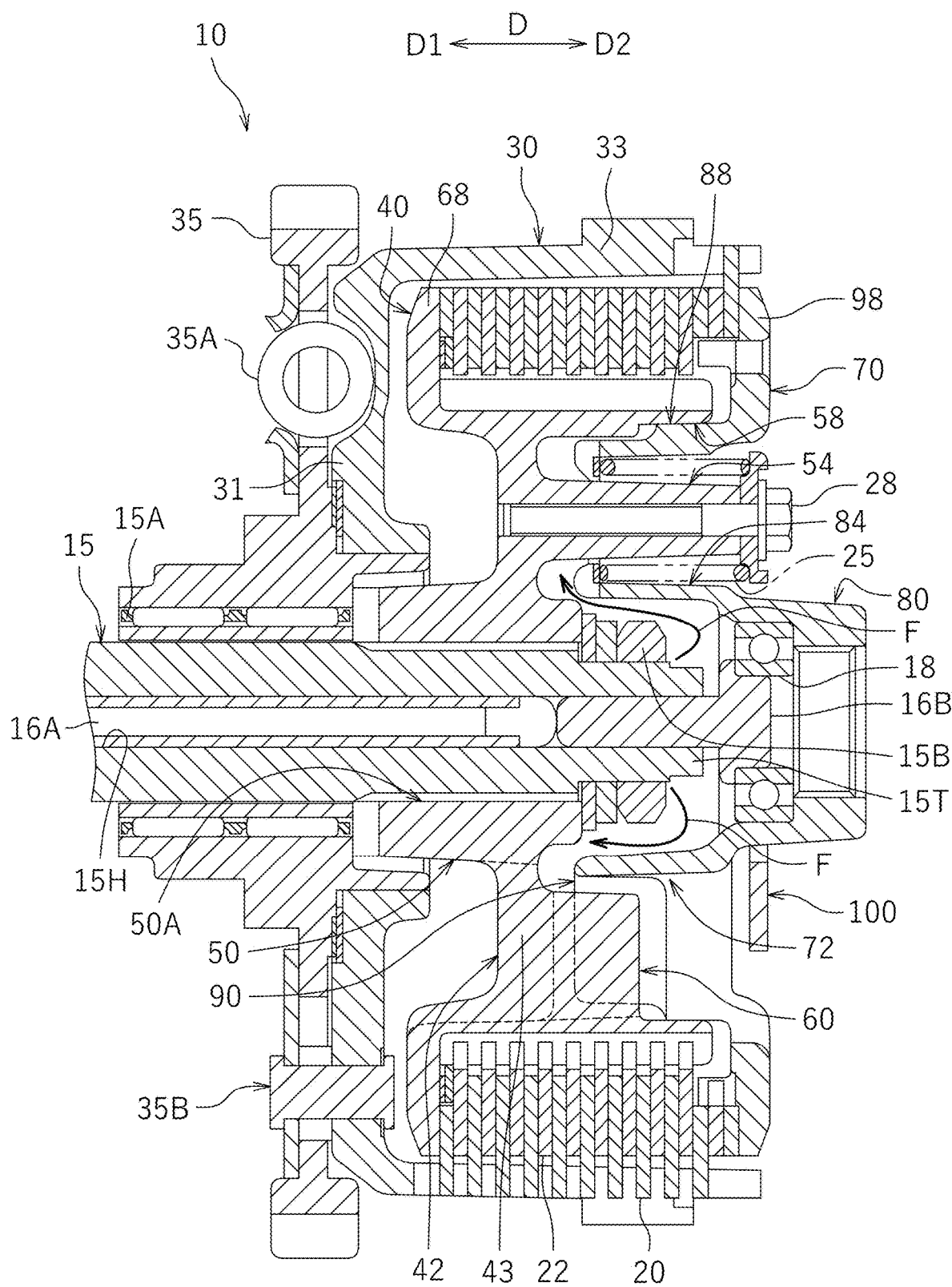
FIG. 1 is a cross-sectional view of a clutch device according to one preferred embodiment of the present invention.

Clutch devices according to preferred embodiments of the present disclosure will be described hereinafter with reference to the drawings. The preferred embodiments described herein are, of course, not intended to particularly limit the present disclosure. Elements and features having the same functions are denoted by the same reference characters, and description for the same elements and features will not be repeated or will be simplified as appropriate.

First Preferred Embodiment

FIG. 1 is a cross-sectional view of a clutch device 10 according to this preferred embodiment. The clutch device 10 is provided in a vehicle such as a motorcycle, for example. The clutch device 10 allows or interrupts transfer of a rotation driving force of an input shaft (crankshaft) of an engine of the motorcycle to an output shaft 15, for example. The clutch device 10 allows or interrupts transfer of a rotation driving force of the input shaft to a drive wheel (rear wheel) through the output shaft 15. The clutch device 10 is disposed between the engine and a transmission.

In the following description, directions in which a pressure plate 70 of the clutch device 10 moves toward and away from the clutch center 40 will be referred to as directions D, a direction in which the pressure plate 70 moves toward the clutch center 40 will be referred to as a first direction D1, and a direction in which the pressure plate 70 moves away from the clutch center 40 will be referred to as a second direction D2. Circumferential directions of the clutch center 40 and the pressure plate 70 will be referred to as circumferential directions S, one of the circumferential direction S from one pressure-side cam portion 90 to another pressure-side cam portion 90 (direction from one center-side cam portion 60 to another center-side cam portion 60) will be referred to as a first circumferential direction S1 (see FIG. 7), and one of the circumferential direction S from the other pressure-side cam portion 90 to the one pressure-side cam portion 90 (direction from the other center-side cam portions 60 to the one center-side cam portions 60) will be referred to as a second circumferential direction S2 (see FIG. 7). In this preferred embodiment, axial directions of the output shaft 15, axial directions of a clutch housing 30, axial directions of the clutch center 40, and axial directions of the pressure plate 70 are the same as the directions D. The pressure plate 70 and the clutch center 40 rotate in the first circumferential direction S1 (i.e., direction from a center-side assist cam surface 60A to a center-side slipper cam surface 60S in one center-side cam portion 60). It should be noted that the directions described above are defined simply for convenience of description, and are not intended to limit the state of installation of the clutch device 10 and do not limit the present disclosure.

As illustrated in FIG. 1, the clutch device 10 includes the output shaft 15, input-side rotating plates 20, output-side rotating plates 22, the clutch housing 30, the clutch center 40, the pressure plate 70, and a stopper plate 100.

As illustrated in FIG. 1, the output shaft 15 is a hollow shaft. One end of the output shaft 15 rotatably supports an input gear 35 described later and the clutch housing 30 through a needle bearing 15A. The output shaft 15 fixedly supports a clutch center 40 through a nut 15B. That is, the output shaft 15 rotates together with the clutch center 40. The other end of the output shaft 15 is coupled to a transmission (not shown) of an automobile, for example.

As illustrated in FIG. 1, the output shaft 15 includes, in a hollow portion 15H thereof, a push rod 16A and a push member 16B adjacent to the push rod 16A. The hollow portion 15H serves as a channel of clutch oil. Clutch oil flows in the output shaft 15, that is, in the hollow portion 15H. The push rod 16A and the push member 16B are slidable in the hollow portion 15H of the output shaft 15. The push rod 16A has one end (left end in the drawing) coupled to a clutch operation lever (not shown) of the motorcycle, and slides in the hollow portion 15H by operation of the clutch operation lever and presses the clutch push member 16B in the second direction D2. A portion of the push member 16B projects outward of the output shaft 15 (in the second direction D2 in this preferred embodiment) and is coupled to a release bearing 18 provided on the pressure plate 70. The push rod 16A and the push member 16B are thinner than the inner diameter of the hollow portion 15H so that flowability of clutch oil is obtained in the hollow portion 15H.

The clutch housing 30 is made of an aluminum alloy. The clutch housing 30 has a bottomed cylindrical shape. As illustrated in FIG. 1, the clutch housing 30 includes a bottom wall 31 having a substantially circular shape, and a side wall 33 extending from an edge of the bottom wall 31 in the second direction D2. The clutch housing 30 holds the plurality of input-side rotating plates 20.

As illustrated in FIG. 1, an input gear 35 is disposed on the bottom wall 31 of the clutch housing 30. The input gear 35 is fixed to the bottom wall 31 by a rivet 35B through a torque damper 35A. The input gear 35 meshes with a driving gear (not shown) that rotates by rotational driving of the input shaft of the engine. The input gear 35 is rotationally driven together with the clutch housing 30, independently of the output shaft 15.

The input-side rotating plates 20 is rotationally driven by rotational driving of the input shaft. As illustrated in FIG. 1, the input-side rotating plates 20 are held on the inner peripheral surface of the side wall 33 of the clutch housing 30. The input-side rotating plates 20 are held in the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against the output-side rotating plates 22. The input-side rotating plates 20 are ring-shaped flat plates. Each of the input-side rotating plates 20 is shaped by punching a thin plate of a steel plate cold commercial (SPCC) material into a ring shape. Friction members (not shown) of a plurality of paper sheets are attached to the front and back surfaces of the input-side rotating plates 20. A groove with a depth of several micrometers to several tens of micrometers is formed between the friction members to hold clutch oil.

As illustrated in FIG. 1, the clutch center 40 is housed in the clutch housing 30. The clutch center 40 and the clutch housing 30 are concentrically disposed. The clutch center 40 includes a cylindrical body 42 and a flange 68 extending radially outward from the outer edge of the body 42. The clutch center 40 holds the plurality of output-side rotating plates 22 arranged alternately with the input-side rotating plates 20 in the directions D. The clutch center 40 is rotationally driven together with the output shaft 15.

Figure 2:
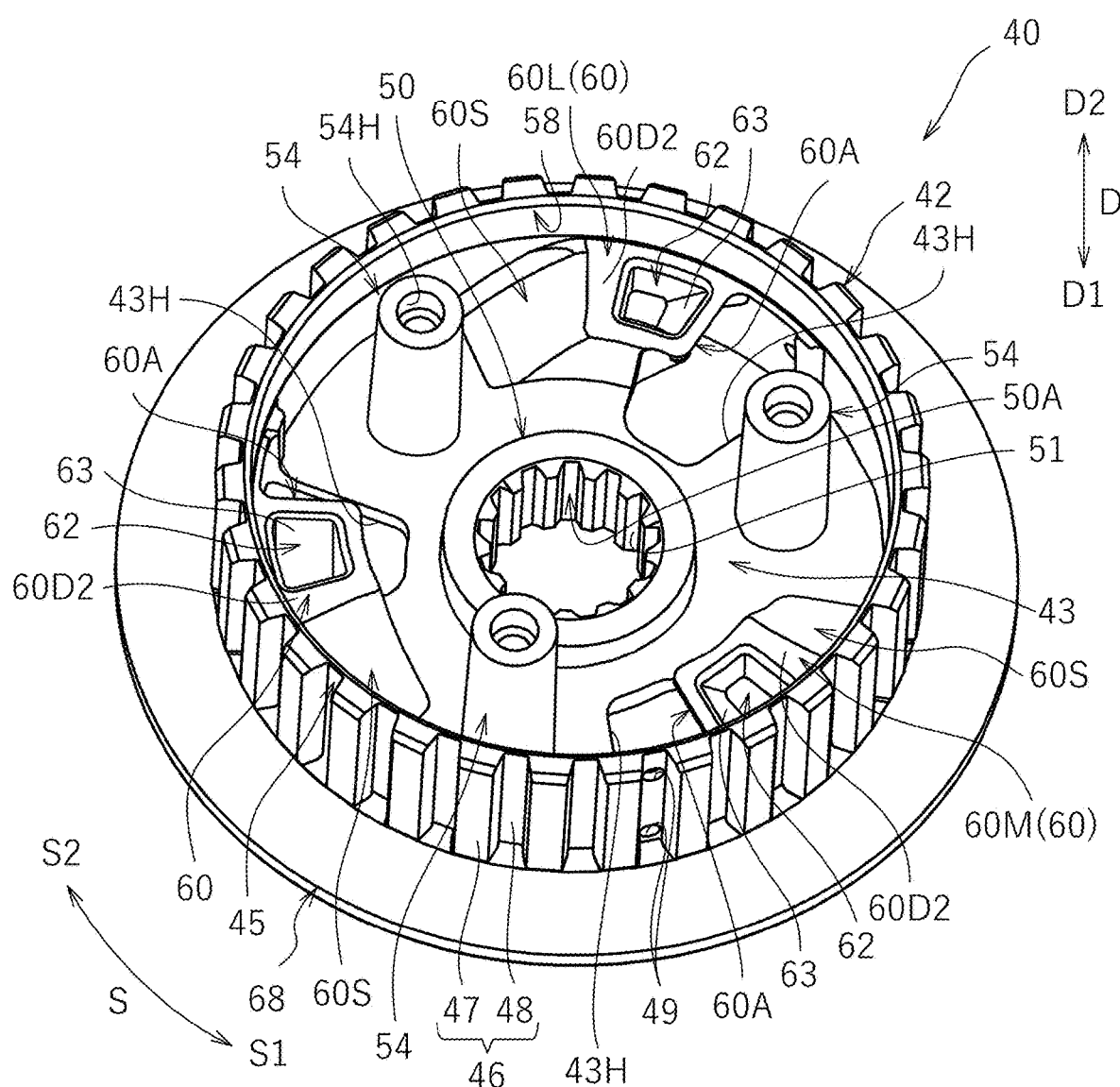
FIG. 2 is a perspective view of a clutch center according to one preferred embodiment of the present invention.

As illustrated in FIG. 2, the body 42 includes a ring-shaped base wall 43, an outer peripheral wall 45 located radially outward of the base wall 43 and extending in the second direction D2, an output shaft holding portion 50 disposed at the center of the base wall 43, a plurality of center-side cam portions 60 connected to the base wall 43 and the outer peripheral wall 45, and a center-side fitting portion 58.

The output shaft holding portion 50 has a cylindrical shape. The output shaft holding portion 50 has an insertion hole 51 in which the output shaft 15 is inserted and spline-fitted. The insertion hole 51 penetrates the base wall 43. An inner peripheral surface 50A of the output shaft holding portion 50 defining the insertion hole 51 includes a plurality of spline grooves formed along the axial direction. The output shaft 15 is coupled to the output shaft holding portion 50.

As illustrated in FIG. 2, the outer peripheral wall 45 of the clutch center 40 is disposed radially outward of the output shaft holding portion 50. The outer peripheral wall 45 is located radially outward of the center-side cam portions 60. The outer peripheral surface 45A of the outer peripheral wall 45 includes a spline fitting portion 46. The spline fitting portion 46 includes a plurality of center-side fitting teeth 47 extending in the axial directions of the clutch center 40 along the outer peripheral surface 45A of the outer peripheral wall 45, a plurality of spline grooves 48 each formed between adjacent ones of the center-side fitting teeth 47 and extending in the axial directions of the clutch center 40, and oil flow holes 49. The center-side fitting teeth 47 hold the output-side rotating plates 22. The plurality of center-side fitting teeth 47 are arranged in the circumferential directions S. The plurality of center-side fitting teeth 47 are arranged at regular or substantially regular intervals in the circumferential directions S. The plurality of center-side fitting teeth 47 have the same or substantially the same shape. The center-side fitting teeth 47 project radially outward from the outer peripheral surface 45A of the outer peripheral wall 45. The oil flow holes 49 penetrate the outer peripheral wall 45 along the radial directions. Each of the oil flow holes 49 is formed between adjacent ones of the center-side fitting teeth 47. That is, the oil flow holes 49 are formed in the spline grooves 48. The oil flow holes 49 are formed at the sides of the center-side cam portions 60. More specifically, the discharge holes 49 are formed at the sides of the center-side slipper cam surfaces 60S of the center-side cam portions 60. The oil flow holes 49 are located ahead of the center-side slipper cam surfaces 60S in the second circumferential direction S2. The oil flow holes 49 are located ahead of bosses 54 described later in the first circumferential direction S1. In this preferred embodiment, two oil flow holes 49 are formed in each of three portions of the peripheral wall 45 in the circumferential directions S. The oil flow holes 49 are arranged at regular or substantially regular intervals in the circumferential directions S. The oil flow holes 49 cause the inside and outside of the clutch center 40 to communicate with each other. The oil flow holes 49 allow clutch oil that has flowed from the output shaft 15 into the clutch center 40 to be discharged to the outside of the clutch center 40.

The output-side rotating plates 22 are held by the spline fitting portion 46 of the clutch center 40 and the pressure plate 70. A portion of the output-side rotating plates 22 is held by the center-side fitting teeth 47 of the clutch center 40 and the spline grooves 48 by spline fitting. Another portion of the output-side rotating plates 22 is held by pressure-side fitting teeth 77 (see FIG. 6, described later) of the pressure plate 70. The output-side rotating plates 22 are displaceable along the axial directions of the clutch center 40. The output-side rotating plates 22 are rotatable together with the clutch center 40.

The output-side rotating plates 22 are pushed against the input-side rotating plates 20. The output-side rotating plates 22 are ring-shaped flat plates. Each of the output-side rotating plates 22 is shaped by punching a thin plate of an SPCC material into a ring shape. The front and back surfaces of the output-side rotating plates 22 have grooves with depths of several micrometers to several tens of micrometers, for example, to hold clutch oil. The front and back surfaces of the output-side rotating plates 22 are subjected to a surface hardening treatment to enhance abrasion resistance. The friction members provided on the input-side rotating plates 20 may be provided on the output-side rotating plates 22 instead of the input-side rotating plates 20, or may be provided on both the input-side rotating plates 20 and the output-side rotating plates 22.

Figure 3:
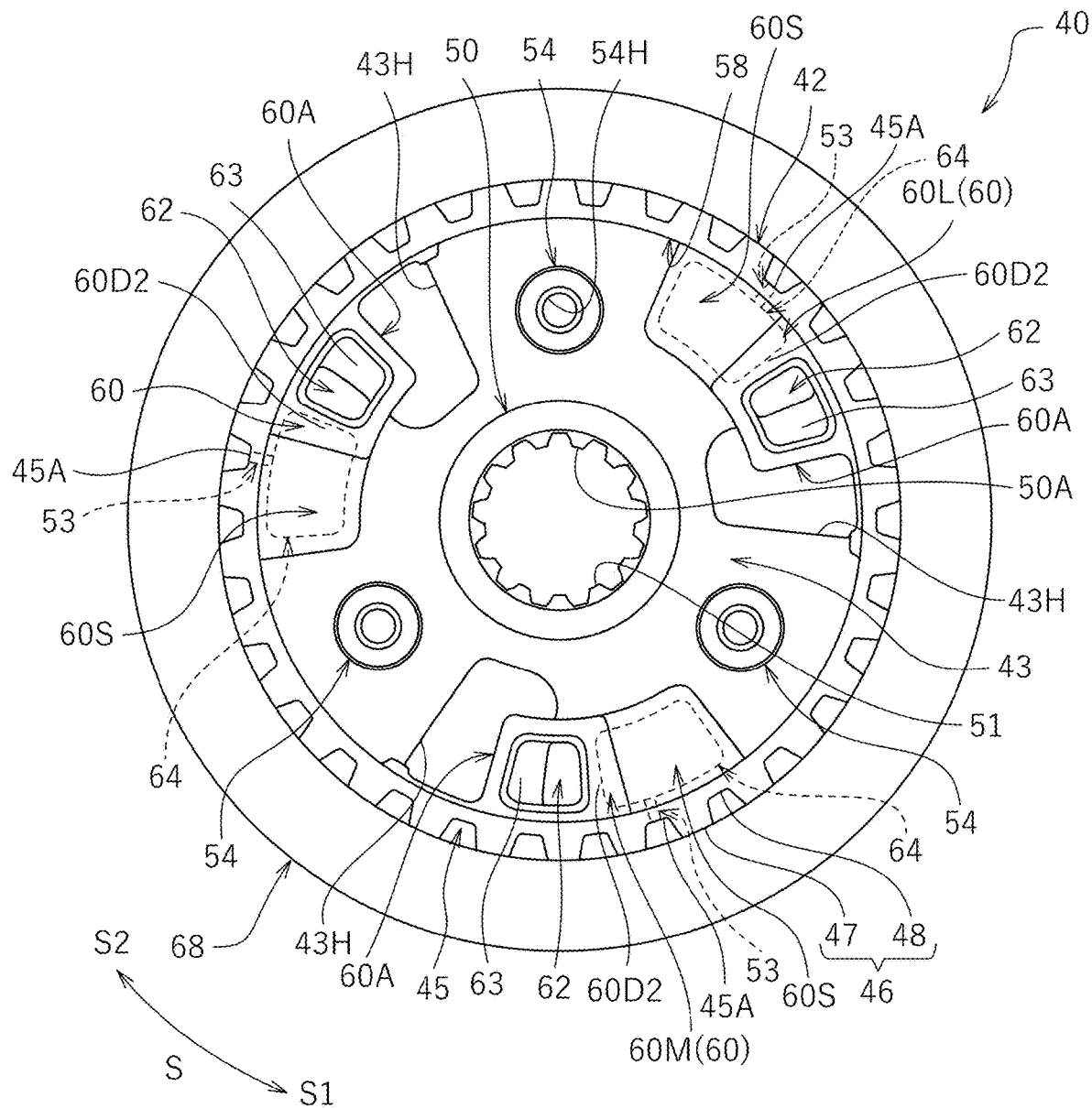
FIG. 3 is a plan view of a clutch center according to one preferred embodiment of the present invention.

Each of the center-side cam portions 60 is formed in a trapezoidal shape including a cam surface of a slope defining an assist & slipper (registered trademark) mechanism that generates an assist torque as a force of increasing a pressing force (contact pressure force) between the input-side rotating plates 20 and the output-side rotating plates 22 or a slipper torque as a force of separating the input-side rotating plates 20 and the output-side rotating plates 22 from each other early and shifting these plates into a half-clutch state. The center-side cam portions 60 project from the base wall 43 in the second direction D2. As illustrated in FIG. 3, the center-side cam portions 60 are arranged at regular or substantially regular intervals in the circumferential directions S of the clutch center 40. In this preferred embodiment, the clutch center 40 includes three center-side cam portions 60, but the number of the center-side cam portions 60 is not limited to three.

As illustrated in FIG. 3, the center-side cam portions are located radially outward of the output shaft holding portion 50. Each of the center-side cam portions 60 includes the center-side assist cam surface 60A and the center-side slipper cam surface 60S. The center-side assist cam surface 60A is configured to generate a force in a direction in which the pressure plate 70 approaches the clutch center 40 in order to increase a pressing force (contact pressure force) between the input-side rotating plates 20 and the output-side rotating plates 22 in relative rotation to the pressure plate 70. In this preferred embodiment, when this force is generated, the position of the pressure plate 70 to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40 in order to reduce the pressing force (contact pressure force) between the input-side rotating plates 20 and the output-side rotating plates 22 in relative rotation to the pressure plate 70. In the center-side cam portions 60 adjacent to each other in the circumferential directions S, the center-side assist cam surface 60A of one center-side cam portion 60L and the center-side slipper cam surface 60S of the other center-side cam portion 60M are opposed to each other in the circumferential directions S.

Figure 5:
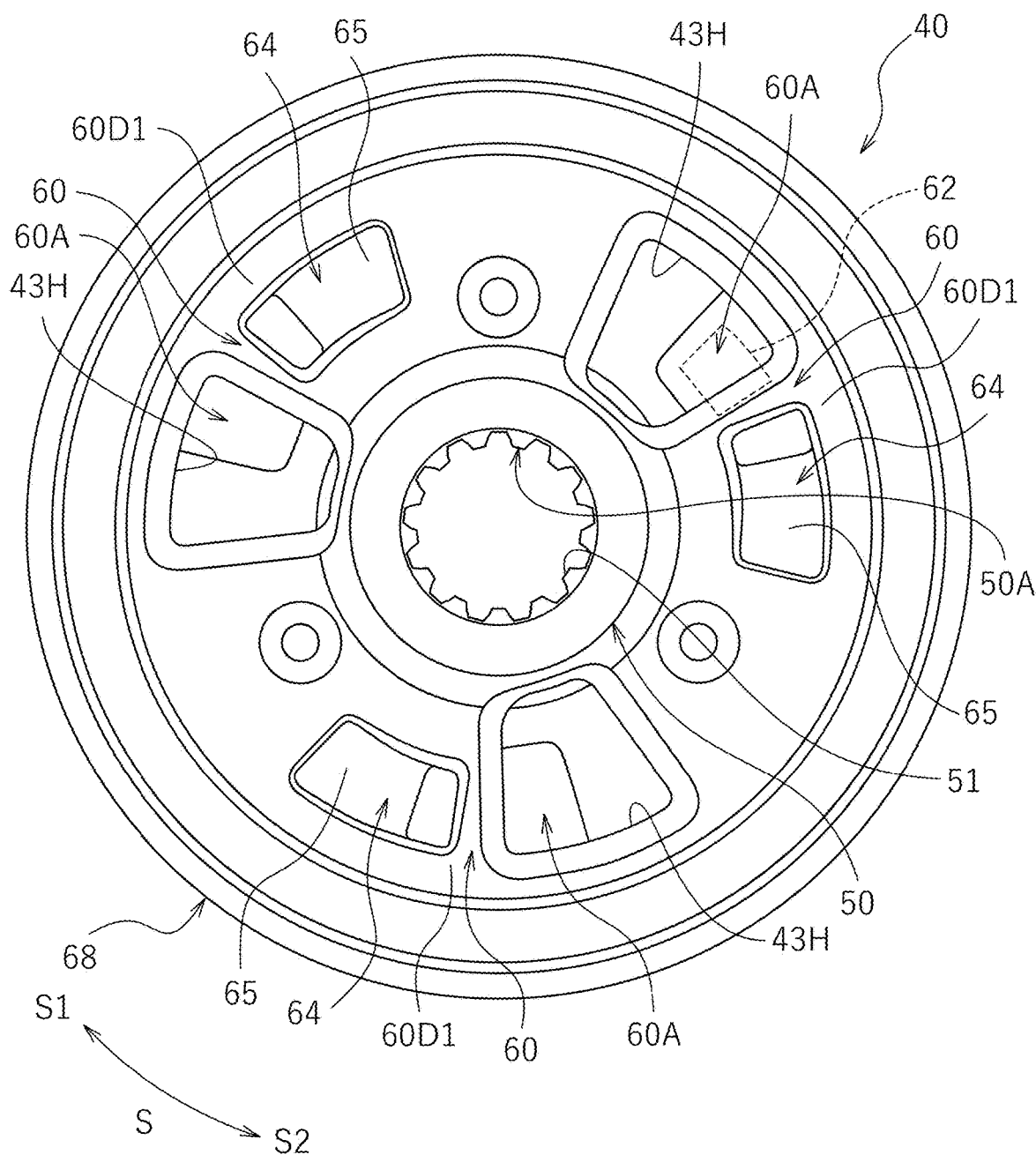
FIG. 5 is a plan view of a clutch center according to one preferred embodiment of the present invention.
Figure 14:
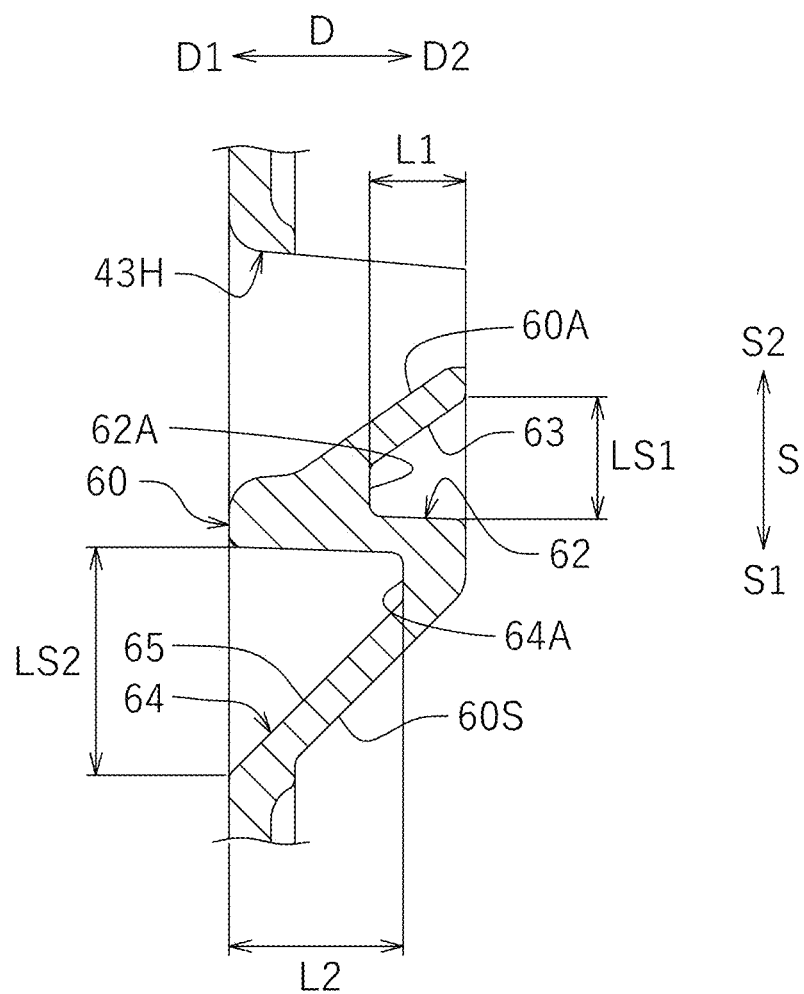
FIG. 14 is a cross-sectional view of a center-side cam portion according to one preferred embodiment of the present invention.

As illustrated in FIG. 2, each of the center-side cam portions 60 includes a first center-side recess 62 that is recessed in the first direction D1 from a surface 60D2 of the center-side cam portion 60 at the side of the second direction D2. The first center-side recess 62 is located ahead of the center-side slipper cam surface 60S in the second circumferential direction S2. As illustrated in FIG. 5, when seen in the axial directions (i.e., directions D) of the output shaft 15, at least a portion of the first center-side recess 62 overlaps with the center-side assist cam surface 60A. As illustrated in FIG. 14, when seen in the axial direction of the output shaft 15 (i.e., directions D), for example, at least about one half of the first center-side recess 62 overlaps with the center-side assist cam surface 60A with respect to the circumferential directions S. When seen in the axial direction of the output shaft 15 (i.e., directions D), for example, at least about one half of the first center-side recess 62 overlaps with a center-side cam hole 43H with respect to the circumferential directions S. The first center-side recess 62 includes a first center-side slope 63 parallel or substantially parallel to the center-side assist cam surface 60A. The first center-side slope 63 tilts to gradually approach the second direction D2 in the second circumferential direction S2.

Figure 4:
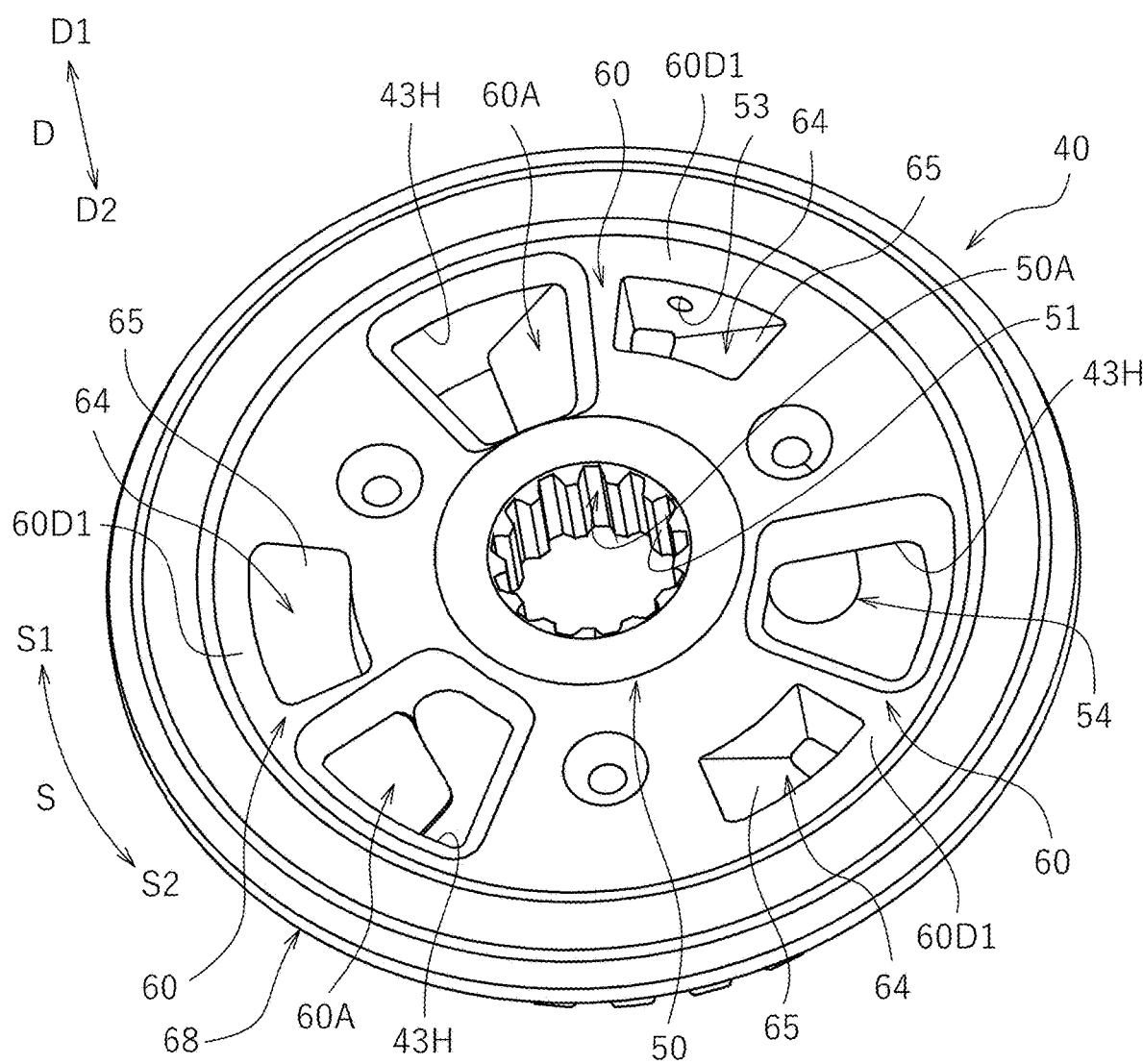
FIG. 4 is a perspective view of a clutch center according to one preferred embodiment of the present invention.

As illustrated in FIG. 4, each of the center-side cam portions 60 includes a second center-side recess 64 that is recessed in the second direction D2 from a surface 60D1 of the center-side cam portion 60 at the side of the first direction D1. The second center-side recess 64 is located ahead of the center-side assist cam surface 60A in the first circumferential direction S1. As illustrated in FIG. 3, when seen in the axial direction of the output shaft 15 (i.e., directions D), at least a portion of the second center-side recess 64 overlaps with the center-side slipper cam surface 60S. As illustrated in FIG. 14, the second center-side recess 64 includes a second center-side slope 65 parallel or substantially parallel to the center-side slipper cam surface 60S. The second center-side slope 65 tilts to gradually approach the first direction D1 in the first circumferential direction S1.

As illustrated in FIG. 14, an end 62A of the first center-side recess 62 in the first direction D1 is located ahead, in the first direction D1, of an end 64A of the second center-side recess 64 in the second direction D2. The end 62A of the first center-side recess 62 in the first direction D1 may be located ahead, in the second direction D2, of the end 64A of the second center-side recess 64 in the second direction D2. A length L1 of the first center-side recess 62 in the directions D is shorter than a length L2 of the second center-side recess 64 in the directions D. A length LS1 of the first center-side recess 62 in the circumferential directions S is shorter than a length LS2 of the second center-side recess 64 in the circumferential directions S. As illustrated in FIG. 3, when seen in the axial direction of the output shaft 15 (i.e., directions D), the first center-side recess 62 and the second center-side recess 64 do not overlap with each other.

As illustrated in FIG. 3, the clutch center 40 includes an oil passage 53 formed through the peripheral wall 45. The oil passage 53 is formed in spline grooves 48 to penetrate the peripheral wall 45. The oil passage 53 is formed between adjacent ones of the center-side fitting teeth 47. One end of the oil passage 53 is open radially inward and communicates with the second center-side recess 64. The other end of the oil passage 53 is open radially outward and communicates with the outside of the peripheral wall 45. The oil passage 53 guides clutch oil that has flowed out of the output shaft 15 into the second center-side recess 64 from the side of the clutch center 40 in the first direction D1 to the outside of the clutch center 40 (radially outward of the clutch center 40) through the spline grooves 48. Accordingly, clutch oil is supplied through the oil passage 53 to the output-side rotating plates 22 and the input-side rotating plates 20 held by the center-side fitting teeth 47.

As illustrated in FIG. 2, the clutch center 40 includes the plurality of (for example, three in this preferred embodiment) bosses 54. The bosses 54 support the pressure plate 70. The plurality of bosses 54 are arranged at regular or substantially regular intervals in the circumferential directions S. Each of the bosses 54 has a cylindrical shape. The bosses 54 are located radially outward of the output shaft holding portion 50. The bosses 54 extend toward the pressure plate 70 (i.e., in the second direction D2). The bosses 54 are disposed on the base wall 43. The bosses 54 have screw holes 54H in which bolts 28 (see FIG. 1) are inserted. The screw holes 54H extend in the axial directions of the clutch center 40.

As illustrated in FIG. 2, the center-side fitting portion 58 is located radially outward of the output shaft holding portion 50. The center-side fitting portion 58 is located radially outward of the center-side cam portions 60. The center-side fitting portion 58 is disposed ahead of the center-side cam portions 60 in the second direction D2. The center-side fitting portion 58 is formed on the inner peripheral surface of the outer peripheral wall 45. The center-side fitting portion 58 is slidably fitted onto a pressure-side fitting portion 88 (see FIG. 6) described later. The inner diameter of the center-side fitting portion 58 has a fitting tolerance allowing distribution of clutch oil flowing out of a distal end 15T of the output shaft 15 to the pressure-side fitting portion 88. That is, a gap is formed between the center-side fitting portion 58 and the pressure-side fitting portion 88 described later. In this preferred embodiment, for example, the center-side fitting portion 58 has an inner diameter larger than the outer diameter of the pressure-side fitting portion 88 by about 0.1 mm. This dimensional tolerance between the inner diameter of the center-side fitting portion 58 and the outer diameter of the pressure-side fitting portion 88 is appropriately set in accordance with the amount of clutch oil intended to be distributed, and is, for example, about 0.1 mm or more and about 0.5 mm or less.

As illustrated in FIGS. 2 and 3, the clutch center 40 includes the center-side cam holes 43H penetrating a portion of the base wall 43. The center-side cam holes 43H extend from portions on the side of the output shaft holding portion 50 to the outer peripheral wall 45. The center-side cam holes 43H are formed through the base wall 43 between adjacent ones of the center-side cam portion 60. Each center-side cam hole 43H is formed between the center-side assist cam surface 60A of the center-side cam portion 60 and the boss 54. When seen in the axial direction of the clutch center 40, the center-side assist cam surface 60A overlaps with a portion of the center-side cam hole 43H.

As illustrated in FIG. 1, the pressure plate 70 is movable toward or away from the clutch center 40 and rotatable relative to the clutch center 40. The pressure plate 70 is configured to press the input-side rotating plates 20 and the output-side rotating plates 22. The pressure plate 70 is disposed coaxially with the clutch center 40 and the clutch housing 30. The pressure plate 70 includes a body 72, and a flange 98 connected to the outer edge of the body 72 on the side of the second direction D2 and extending radially outward. The body 72 projects ahead of the flange 98 in the first direction D1. The flange 98 is located radially outward of a cylindrical portion 80 (see FIG. 6) described later. The pressure plate 70 holds the plurality of output-side rotating plates 22 arranged alternately with the input-side rotating plates 20. The flange 98 is configured to press the input-side rotating plates 20 and the output-side rotating plates 22.

Figure 6:
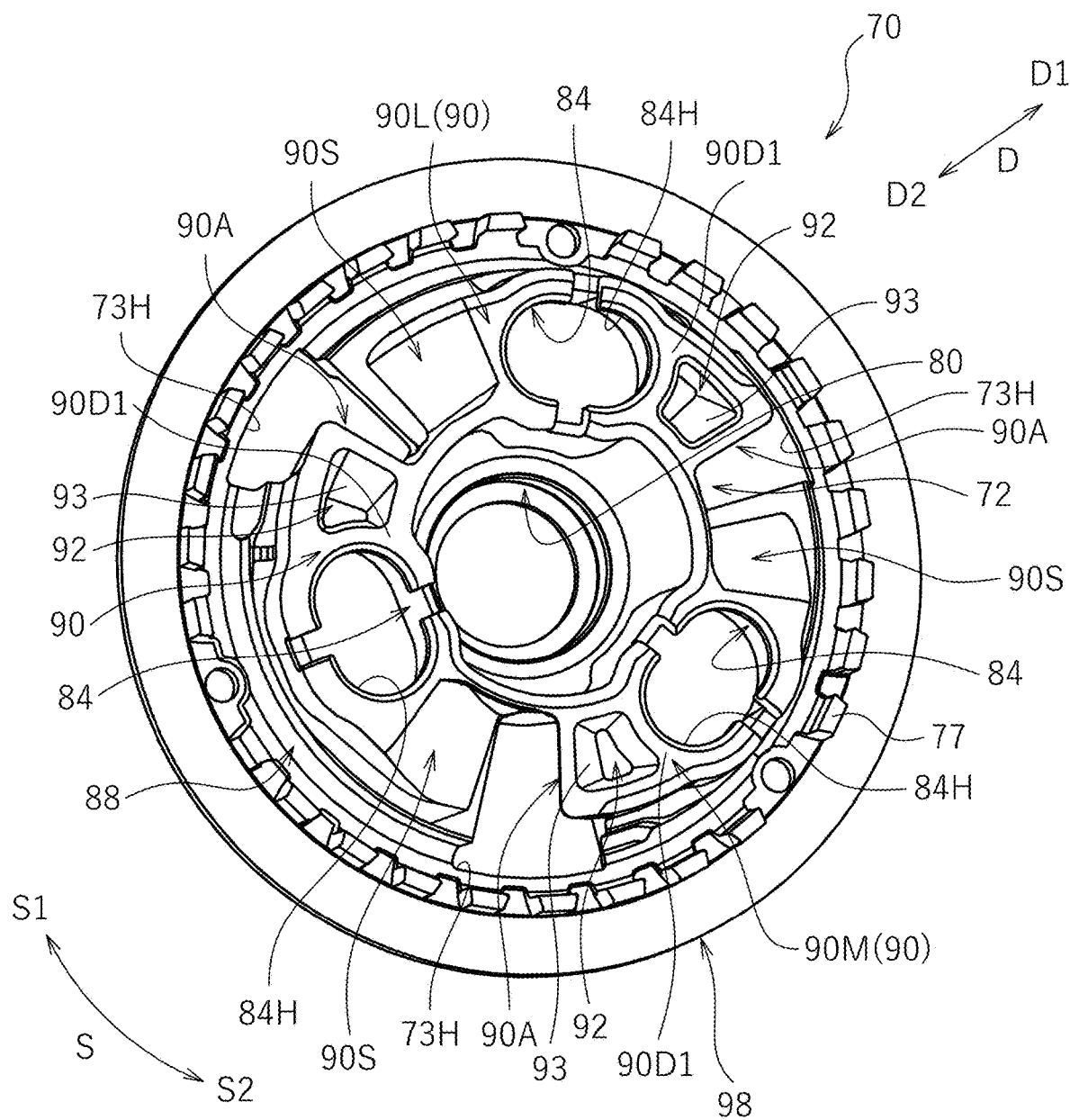
FIG. 6 is a perspective view of a pressure plate according to one preferred embodiment of the present invention.
Figure 8:
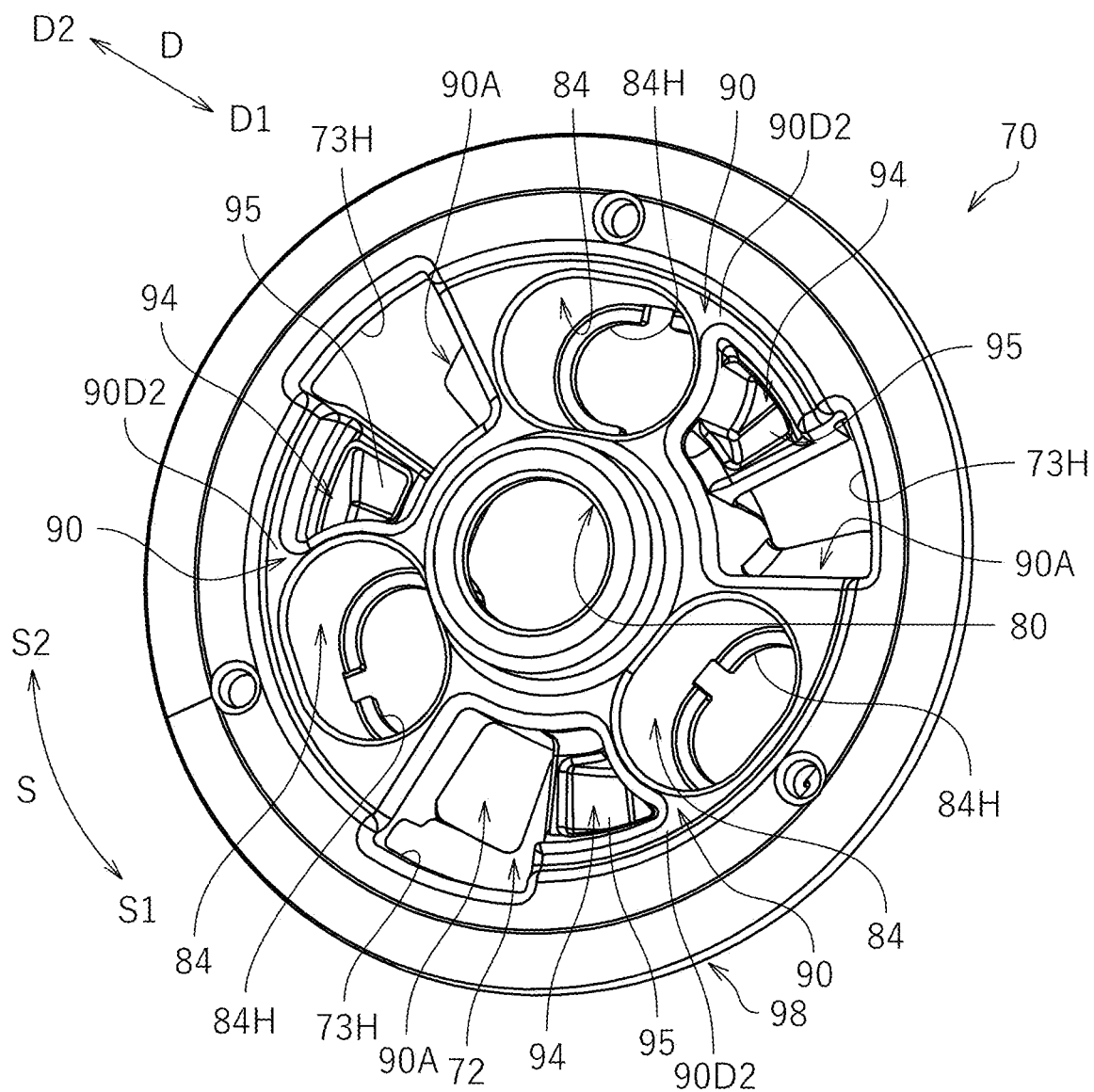
FIG. 8 is a perspective view of a pressure plate according to one preferred embodiment of the present invention.

As illustrated in FIG. 6, the body 72 includes the cylindrical portion 80, the plurality of pressure-side cam portions 90, the pressure-side fitting portion 88, and a spring housing portion 84 (see also FIG. 8).

The cylindrical portion 80 has a cylindrical shape. The cylindrical portion 80 is integrally formed with the pressure-side cam portions 90. The cylindrical portion 80 houses the distal end 15T of the output shaft 15 (see FIG. 1). The cylindrical portion 80 houses the release bearing 18 (see FIG. 1). The cylindrical portion 80 receives a pressing force from the push member 16B. The cylindrical portion 80 receives clutch oil that has flowed out from the distal end 15T of the output shaft 15.

Figure 7:
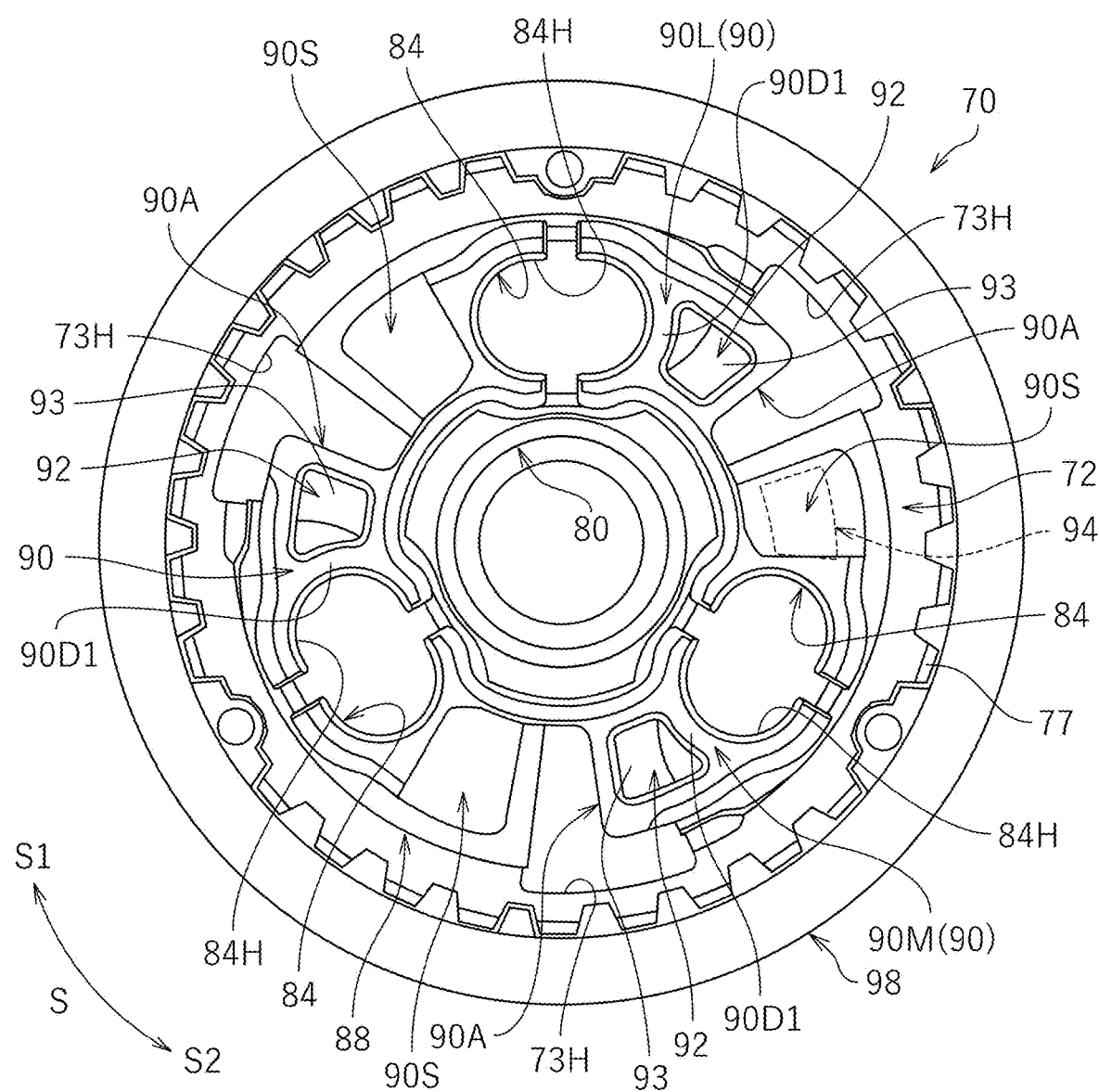
FIG. 7 is a plan view of a pressure plate according to one preferred embodiment of the present invention.

Each of the pressure-side cam portions 90 is formed in a trapezoidal shape having a cam surface of a slope constituting an assist & slipper (registered trademark) mechanism that slides on the center-side cam portions 60 and generates an assist torque or a slipper torque. The pressure-side cam portions 90 project from the flange 98 in the first direction D1. As illustrated in FIG. 7, the pressure-side cam portions 90 are arranged at regular or substantially regular intervals in the circumferential directions S of the pressure plate 70. In this preferred embodiment, the pressure plate 70 includes three pressure-side cam portions 90, but the number of the pressure-side cam portions 90 is not limited to three.

As illustrated in FIG. 7, the pressure-side cam portion 90 is located radially outward of the cylindrical portion 80. Each of the pressure-side cam portions 90 includes a pressure-side assist cam surface 90A (see also FIG. 9) and a pressure-side slipper cam surface 90S. The pressure-side assist cam surface 90A can be brought into contact with the center-side assist cam surface 60A. The pressure-side assist cam surface 90A is configured to generate a force in a direction in which the pressure plate 70 approaches the clutch center 40 in order to increase a pressing force (contact pressure force) between the input-side rotating plates 20 and the output-side rotating plates 22 in relative rotation to the clutch center 40. The pressure-side slipper cam surface 90S can be brought into contact with the center-side slipper cam surface 60S. The pressure-side slipper cam surface 90S is configured to separate the pressure plate 70 from the clutch center 40 in order to reduce a pressing force (contact pressure force) between the input-side rotating plates 20 and the output-side rotating plates 22 in relative rotation to the clutch center 40. In the pressure-side cam portions 90 adjacent to each other in the circumferential directions S, the pressure-side assist cam surface 90A of one pressure-side cam portion 90L and the pressure-side slipper cam surface 90S of the other pressure-side cam portion 90M are opposed to each other in the circumferential directions S.

Figure 9:
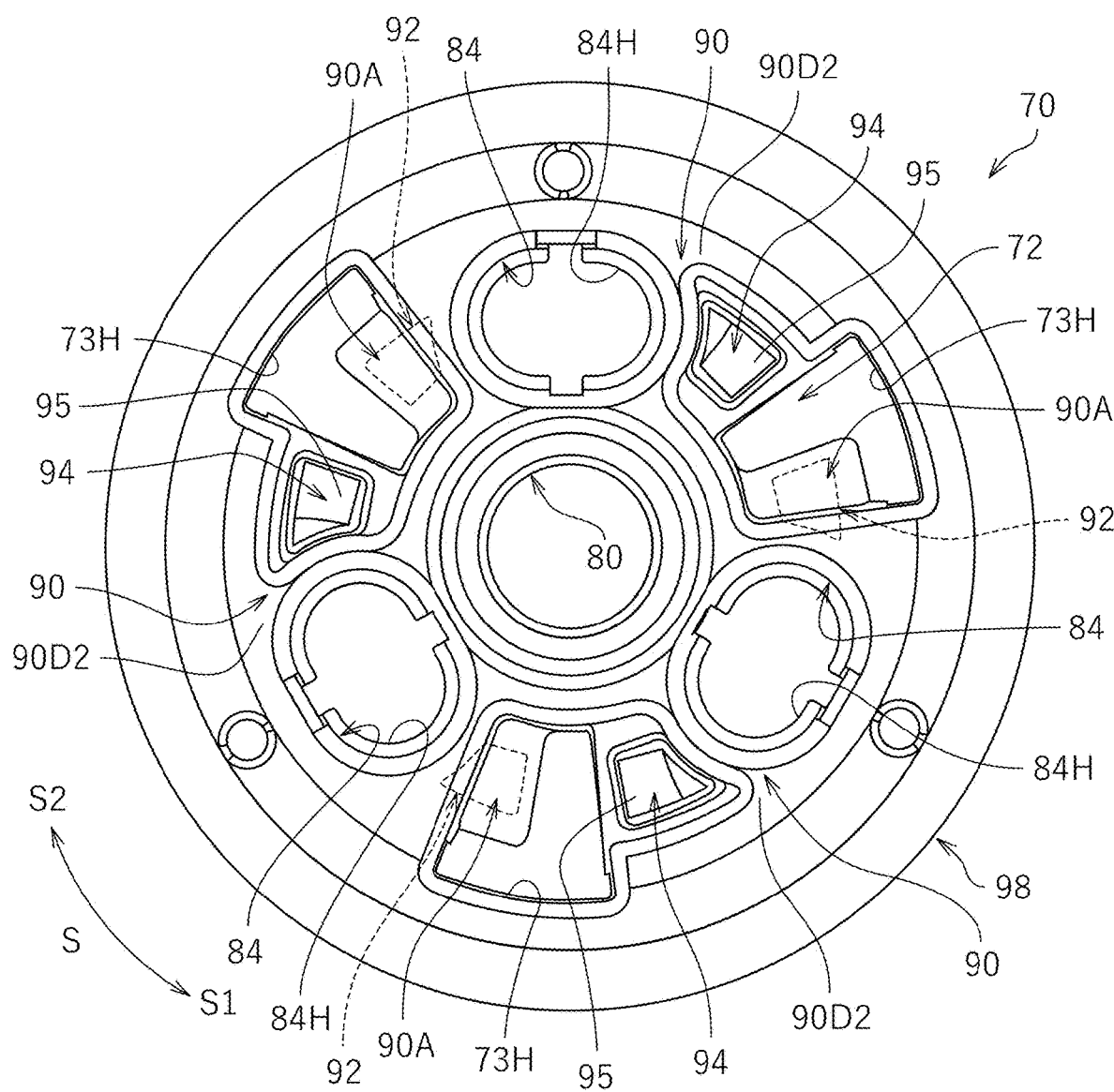
FIG. 9 is a plan view of a pressure plate according to one preferred embodiment of the present invention.
Figure 15:
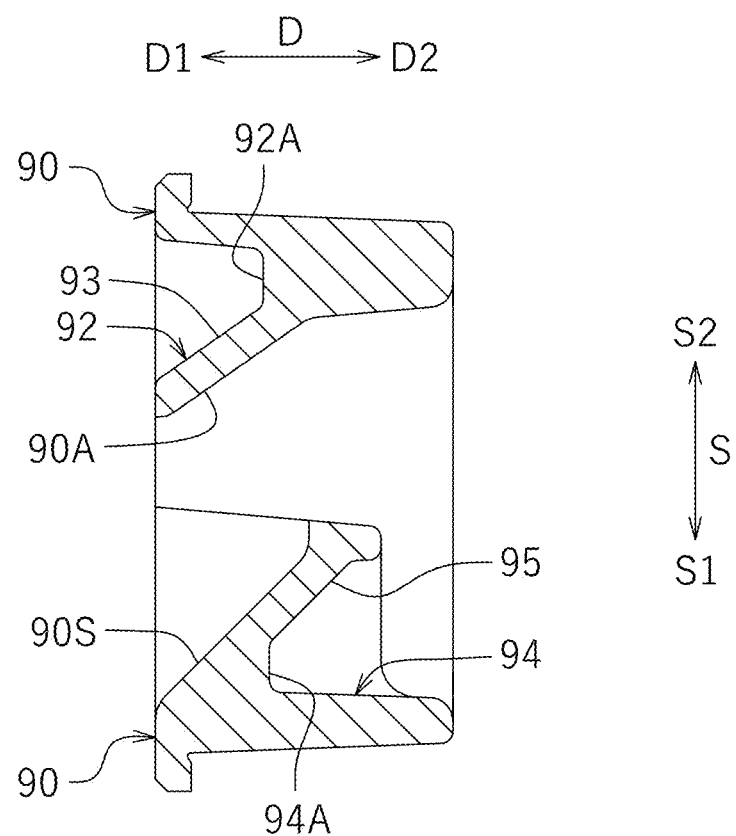
FIG. 15 is a cross-sectional view of a pressure-side cam portion according to one preferred embodiment of the present invention.

As illustrated in FIG. 6, the pressure-side cam portion 90 includes a first pressure-side recess 92 that is recessed in the second direction D2 from a surface 90D1 of the pressure-side cam portion 90 at the side of the first direction D1. The first pressure-side recess 92 is located ahead of the pressure-side slipper cam surface 90S in the first circumferential direction S1. As illustrated in FIG. 9, when seen in the axial direction of the output shaft 15 (i.e., directions D), at least a portion of the first pressure-side recess 92 overlaps with the pressure-side assist cam surface 90A. As illustrated in FIG. 15, the first pressure-side recess 92 includes a first pressure-side slope 93 parallel or substantially parallel to the pressure-side assist cam surface 90A. The first pressure-side slope 93 tilts to gradually approach the first direction D1 in the first circumferential direction S1.

Figure 10:
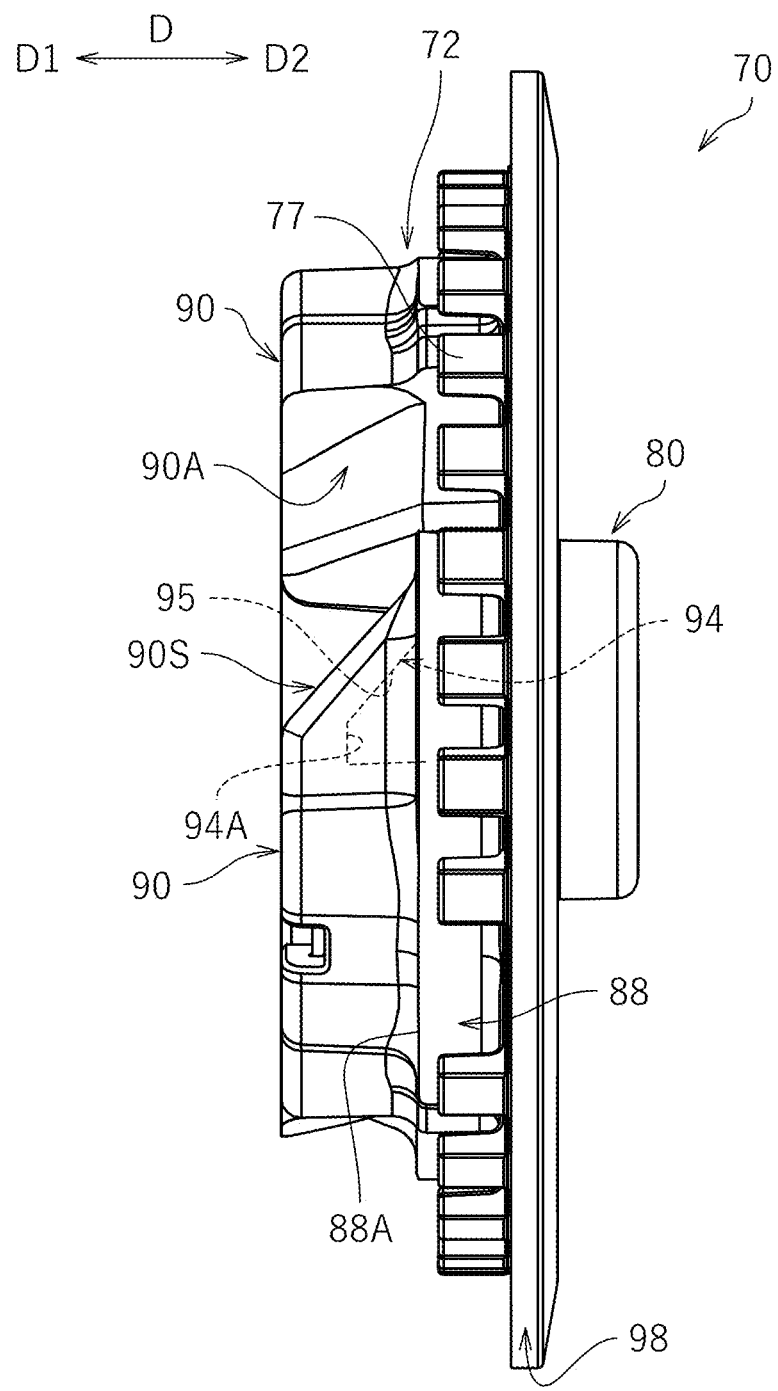
FIG. 10 is a side view of a pressure plate according to one preferred embodiment of the present invention.

As illustrated in FIG. 8, the pressure-side cam portion 90 includes a second pressure-side recess 94 that is recessed in the first direction D1 from a surface 90D2 of the pressure-side cam portion 90 at the side of the second direction D2. The second pressure-side recess 94 is located ahead of the pressure-side assist cam surface 90A in the second circumferential direction S2. As illustrated in FIG. 7, when seen in the axial direction of the output shaft 15 (i.e., directions D), at least a portion of the second pressure-side recess 94 overlaps with the pressure-side slipper cam surface 90S. As illustrated in FIG. 15, the second pressure-side recess 94 includes a second pressure-side slope 95 parallel or substantially parallel to the pressure-side slipper cam surface 90S. The second pressure-side slope 95 tilts to gradually approach the second direction D2 in the second circumferential direction S2. As illustrated in FIG. 10, an end 94A of the second pressure-side recess 94 in the first direction D1 is located ahead, in the first direction D1, of an end 88A of the pressure-side fitting portion 88 in the first direction D1.

As illustrated in FIG. 15, an end 92A of the first pressure-side recess 92 in the second direction D2 is located ahead, in the first direction D1, of the end 94A of the second pressure-side recess 94 in the first direction D1. The end 92A of the first pressure-side recess 92 in the second direction D2 may be located ahead, in the second direction D2, of the end 94A of the second pressure-side recess 94 in the first direction D1. As illustrated in FIG. 3, when seen in the axial direction of the output shaft 15 (i.e., directions D), the first pressure-side recess 92 and the second pressure-side recess 94 do not overlap with each other.

Figure 11:
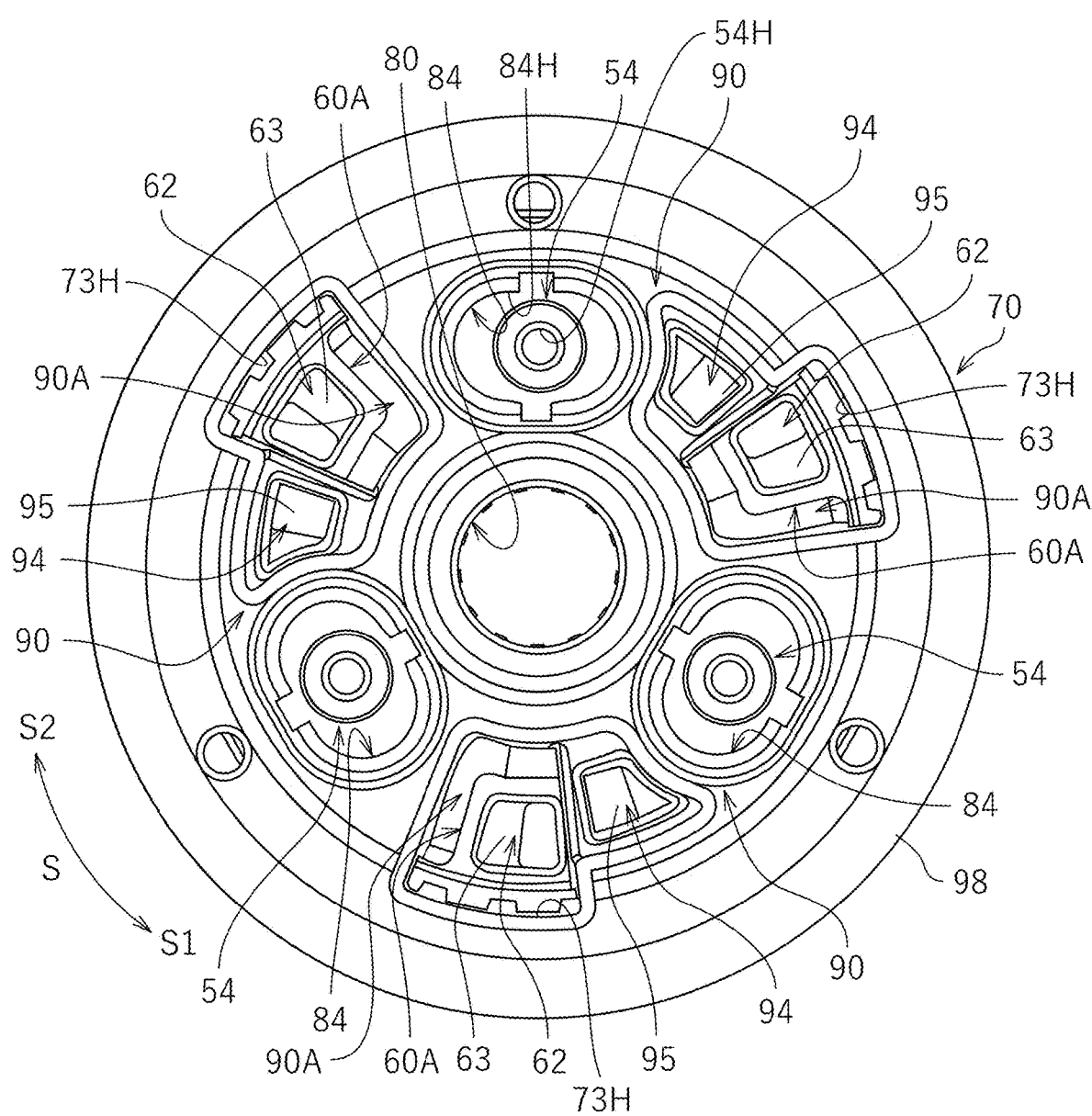
FIG. 11 is a plan view illustrating a state where a clutch center and a pressure plate according to one preferred embodiment of the present invention are combined.
Figure 12:
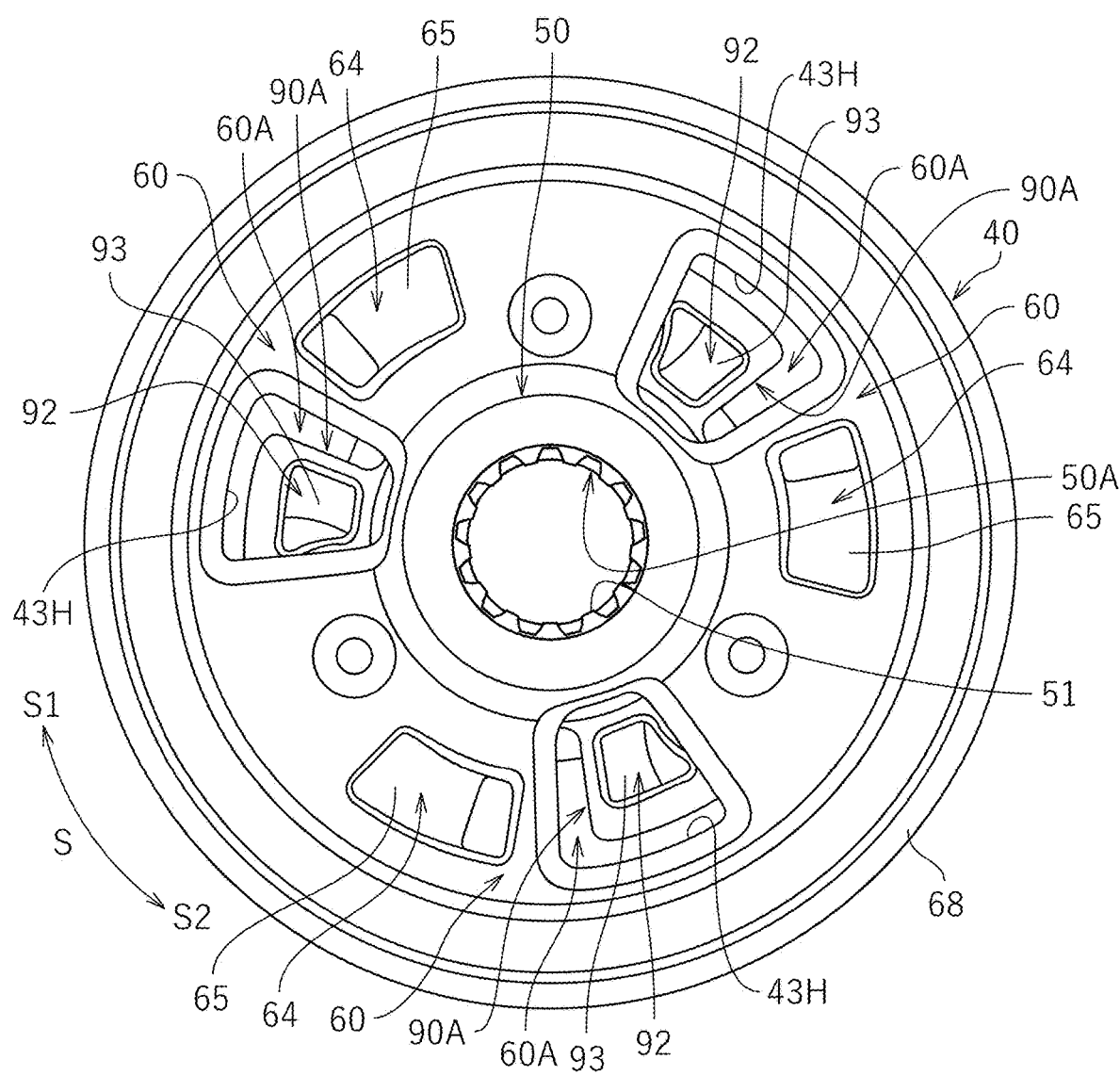
FIG. 12 is a plan view illustrating a state where a clutch center and a pressure plate according to one preferred embodiment of the present invention are combined.

As illustrated in FIG. 11, when seen in the axial direction of the output shaft 15 (i.e., directions D, the first direction D1 in this preferred embodiment), the second pressure-side recess 94 of the pressure plate 70 and the first center-side recess 62 of the clutch center 40 do not overlap with each other. When seen in the axial direction of the output shaft 15 (i.e., directions D, the first direction D1 in this preferred embodiment), at least a portion of the first center-side recess 62 of the clutch center 40 overlaps with the pressure-side cam hole 73H of the pressure plate 70. That is, the first center-side recess 62 is exposed to the outside through the pressure-side cam hole 73H. As illustrated in FIG. 12, when seen in the axial direction of the output shaft 15 (i.e., directions D, the second direction D2 in this preferred embodiment), the first pressure-side recess 92 of the pressure plate 70 does not overlap with the second center-side recess 64 of the clutch center 40. When seen in the axial direction of the output shaft 15 (i.e., directions D, the second direction D2 in this preferred embodiment), at least a portion of the first pressure-side recess 92 of the pressure plate 70 overlaps with the center-side cam hole 43H of the clutch center 40. That is, the first pressure-side recess 92 is exposed to the outside through the center-side cam hole 43H.

Figure 13A:
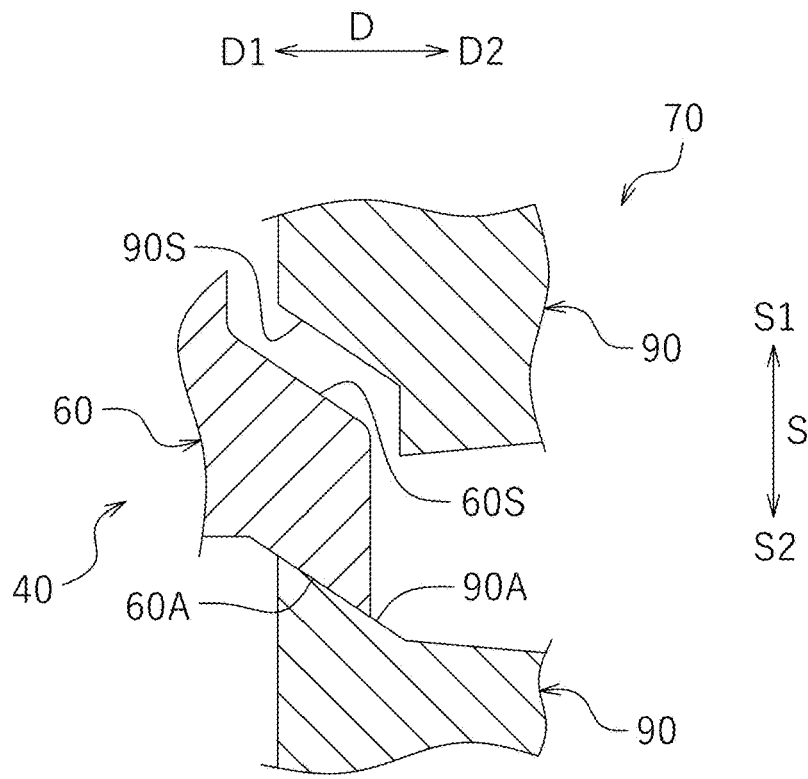
FIG. 13A is a schematic view for describing effects of a center-side assist cam surface and a pressure-side assist cam surface.

Advantages of the center-side cam portions 60 and the pressure-side cam portions 90 will now be described. When the rotation speed of the engine increases so that a rotation driving force input to the input gear 35 and the clutch housing 30 is thereby allowed to be transferred to the output shaft 15 through the clutch center 40, a rotation force in the first circumferential direction S1 is applied to the pressure plate 70, as illustrated in FIG. 13A. Thus, with the effects of the center-side assist cam surface 60A and the pressure-side assist cam surface 90A, a force in first direction D1 is generated in the pressure plate 70. Accordingly, a contact pressure force between the input-side rotating plates 20 and the output-side rotating plates 22 increases. FIG. 13A does not show the center-side recess 62, for example.

Figure 13B:
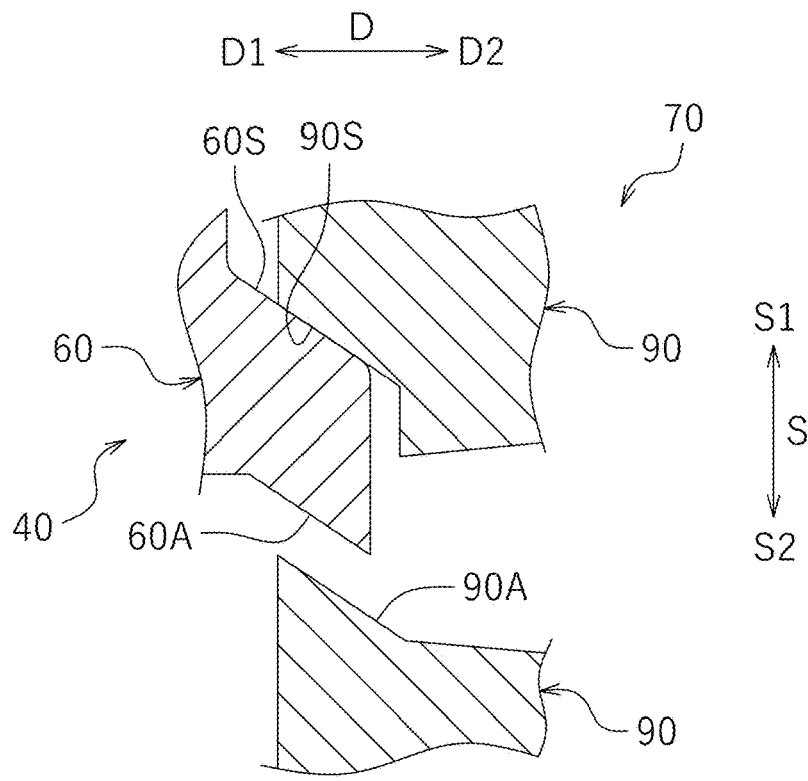
FIG. 13B is a schematic view for describing effects of a center-side slipper cam surface and a pressure-side slipper cam surface.

On the other hand, when the rotation speed of the output shaft 15 exceeds the rotation speed of the input gear 35 and the clutch housing 30 and a back torque is generated, a rotation force in the first circumferential direction S1 is applied to the clutch center 40, as illustrated in FIG. 13B. Thus, with the effects of the center-side slipper cam surface 60S and the pressure-side slipper cam surface 90S, the pressure plate 70 moves in the second direction D2 and releases a contact pressure force between the input-side rotating plates 20 and the output-side rotating plates 22. In this manner, it is possible to avoid problems in the engine and the transmission caused by the back torque. FIG. 13B does not show the first center-side recess 62, for example.

As illustrated in FIG. 6, the pressure-side fitting portion 88 is located radially outside of the pressure-side cam portions 90. The pressure-side fitting portion 88 is located ahead of the pressure-side cam portions 90 in the second direction D2. The pressure-side fitting portion 88 is configured to slidably fit in the center-side fitting portion 58 (see FIG. 2).

As illustrated in FIGS. 6 and 7, the pressure plate 70 includes pressure-side cam holes 73H penetrating the body 72 and a portion of the flange 98. The pressure-side cam holes 73H are located radially outward of the cylindrical portion 80. The pressure-side cam holes 73H extend from portions on the side of the cylindrical portion 80 to the radially outside of the pressure-side fitting portion 88. The pressure-side cam holes 73H are formed through the body 72 between adjacent ones of the pressure-side cam portions 90. Each of the pressure-side cam holes 73H is formed between the pressure-side assist cam surface 90A and the pressure-side slipper cam surface 90S of adjacent ones of the pressure-side cam portions 90. As illustrated in FIGS. 7 and 9, when seen in the axial direction of the pressure plate 70, the pressure-side assist cam surface 90A overlaps with portions of the pressure-side cam holes 73H.

As illustrated in FIG. 6, the pressure plate 70 includes the plurality of pressure-side fitting teeth 77 arranged on the flange 98. The pressure-side fitting teeth 77 hold the output-side rotating plates 22. The pressure-side fitting teeth 77 project from the flange 98 in the first direction D1. The pressure-side fitting teeth 77 are located radially outward of the cylindrical portion 80. The pressure-side fitting teeth 77 are located radially outward of the pressure-side cam portions 90. The pressure-side fitting teeth 77 are located radially outward of the pressure-side fitting portion 88. The plurality of pressure-side fitting teeth 77 are arranged in the circumferential directions S. The plurality of pressure-side fitting teeth 77 are arranged at regular or substantially regular intervals in the circumferential directions S. In this preferred embodiment, since a portion of the pressure-side fitting teeth 77 has been removed, the interval of this portion is enlarged, but the other adjacent pressure-side fitting teeth 77 are arranged at regular or substantially regular intervals.

As illustrated in FIGS. 8 and 9, the spring housing portions 84 are formed in the pressure-side cam portions 90. The spring housing portion 84 is located between the first pressure-side recess 92 and the second pressure-side recess 94. The spring housing portions 84 are recessed from the second direction D2 to the first direction D1. Each of the spring housing portions 84 has an oval shape. The spring housing portions 84 house pressure springs 25 (see FIG. 1). The spring housing portions 84 include the insertion holes 84H which penetrate the spring housing portions 84 and in which the bosses 54 (see FIG. 2) are inserted. That is, the insertion holes 84H penetrate the pressure-side cam portions 90. Each of the insertion holes 84H has an oval shape.

As illustrated in FIG. 1, the pressure springs 25 are housed in the spring housing portions 84. The pressure springs 25 are held by the bosses 54 inserted in the insertion holes 84H of the spring housing portions 84. The pressure springs 25 bias the pressure plate 70 toward the clutch center 40 (i.e., in the first direction D1). The pressure springs 25 are, for example, coil springs obtained by helically winding spring steel.

FIGS. 11 and 12 are plan views each illustrating a state where the clutch center 40 and the pressure plate 70 are combined. In the states illustrated in FIGS. 11 and 12, the pressure-side assist cam surface 90A and the center-side assist cam surface 60A do not contact each other, and the pressure-side slipper cam surface 90S and the center-side slipper cam surface 60S do not contact each other. At this time, the pressure plate 70 is closest to the clutch center 40.

As illustrated in FIG. 1, the stopper plate 100 can contact the pressure plate 70. The stopper plate 100 reduces or prevents separation of the pressure plate 70 from the clutch center by a predetermined distance or more in the second direction D2. The stopper plate 100 is fixed to the bosses 54 of the clutch center 40 with the bolts 28. The pressure plate 70 is fixed by fastening the bolts 28 to the bosses 54 through the stopper plate 100 with the bosses 54 and the pressure springs 25 of the clutch center 40 disposed in the spring housing portions 84. The stopper plate 100 is substantially triangular in plan view.

When the pressure plate 70 is brought into contact with the stopper plate 100, the contact area between the pressure-side slipper cam surface 90S and the center-side slipper cam surface is about 50% or more and about 90% or less of the area of the pressure-side slipper cam surface 90S and about 50% or more and about 90% or less of the area of the center-side slipper cam surface 60S, for example. When the pressure plate 70 is brought into contact with the stopper plate 100, the pressure springs 25 are separated from the side walls of the spring housing portions 84. That is, the pressure springs 25 are not sandwiched between the bosses 54 and the spring housing portions 84, and application of excessive stress to the bosses 54 is reduced or prevented.

The clutch device 10 is filled with a predetermined amount of clutch oil. Clutch oil is distributed in the clutch center 40 and the pressure plate 70 through the hollow portion 15H of the output shaft 15, and then is supplied to the input-side rotating plates 20 and the output-side rotating plates 22 through the gap between the center-side fitting portion 58 and the pressure-side fitting portion 88 and the oil flow holes 49. Clutch oil reduces or prevents absorption of heat and abrasion of the friction members. The clutch device 10 according to this preferred embodiment is a so-called multiplate wet friction clutch device.

Operation of the clutch device 10 according to this preferred embodiment will now be described. As described above, the clutch device 10 is disposed between the engine and the transmission of the motorcycle, and allows or interrupts transfer of a rotation driving force of the engine to the transmission by driver's operation of a clutch operation lever.

In the clutch device 10, in a case where the driver of the motorcycle does not operate the clutch operation lever, a clutch release mechanism (not shown) does not press the push rod 16A, and thus, the pressure plate 70 presses the input-side rotating plates 20 with a biasing force (elastic force) of the pressure springs 25. Accordingly, the clutch center 40 enters a clutch-ON state in which the input-side rotating plates 20 and the output-side rotating plates 22 are pushed against each other to be friction coupled, and is rotationally driven. That is, a rotation driving force of the engine is transferred to the clutch center 40, and the output shaft 15 is rotationally driven.

In the clutch-ON state, clutch oil distributed in the hollow portion H of the output shaft 15 and having flowed out from the distal end 15T of the output shaft 15 is dropped or spattered in the cylindrical portion 80 and attached to the cylindrical portion 80 (see arrow F in FIG. 1). The clutch oil attached to the inside of the cylindrical portion 80 is guided into the clutch center 40. Accordingly, clutch oil flows out of the clutch center 40 through the oil flow holes 49. Clutch oil also flows out of the clutch center 40 through the gap between the center-side fitting portion 58 and the pressure-side fitting portion 88. Then, clutch oil that has flowed out of the clutch center 40 is supplied to the input-side rotating plates 20 and the output-side rotating plates 22.

On the other hand, in the clutch device 10, when the driver of the motorcycle operates the clutch operation lever in the clutch-ON state, the clutch release mechanism (not shown) presses the push rod 16A, and thus, the pressure plate 70 is displaced in a direction away from the clutch center 40 (second direction D2) against a biasing force of the pressure springs 25. Accordingly, the clutch center 40 enters a clutch-OFF state in which friction coupling between the input-side rotating plates 20 and the output-side rotating plates 22 is canceled, and thus, rotational driving attenuates or stops. That is, a rotation driving force of the engine is interrupted to the clutch center 40.

In the clutch-OFF state, clutch oil distributed in the hollow portion H of the output shaft 15 and having flowed out of the distal end 15T of the output shaft 15 is guided into the clutch center 40 in the same or substantially the same manner as in the clutch-ON state. At this time, since the pressure plate 70 is separated from the clutch center 40, the amount of fitting between the pressure plate 70 and each of the center-side fitting portion 58 and the pressure-side fitting portion 88 decreases. As a result, clutch oil in the cylindrical portion 80 actively flows out of the clutch center 40, and is distributed to portions in the clutch device 10. In particular, clutch oil can be actively guided to gaps between the input-side rotating plates 20 and the output-side rotating plates 22 separated from each other.

Then, when the driver cancels the clutch operation lever in the clutch-OFF state, pressing of the pressure plate 70 by the clutch release mechanism (not shown) through the push member 16B is canceled, and thus, the pressure plate 70 is displaced with a biasing force of the pressure springs 25 to a direction (first direction D1) of approaching the clutch center 40.

As described above, in the clutch device 10 according to this preferred embodiment, at least one of the center-side cam portions 60 includes at least one of the first center-side recess 62 that is recessed in the first direction D1 from the surface 60D2 of the center-side cam portion 60 at the side of the second direction D2 or the second center-side recess 64 that is recessed in the second direction D2 form the surface 60D1 of the center-side cam portion 60 in the first direction D1. In this manner, since at least one of the center-side cam portions 60 includes at least one of the first center-side recess 62 or the second center-side recess 64, the center-side cam portions 60 are more lightweight than those not including these recesses. Since the clutch device 10 includes the more lightweight clutch center 40, weight reduction of the entire clutch device 10 is achieved.

In the clutch device 10 according to this preferred embodiment, at least one of the center-side cam portions 60 includes the first center-side recess 62 and the second center-side recess 64. In this configuration, the weight of the center-side cam portions 60 is further reduced.

In the clutch device 10 according to this preferred embodiment, the end 62A of the first center-side recess 62 in the first direction D1 is located ahead, in the first direction D1, of the end 64A of the second center-side recess 64 in the second direction D2. In this configuration, the weight of the center-side cam portions 60 is further reduced.

In the clutch device 10 according to this preferred embodiment, when seen in the axial direction of the output shaft 15 (i.e., directions D), at least a portion of the first center-side recess 62 overlaps with the center-side assist cam surface 60A. In this configuration, since a portion including the center-side assist cam surface 60A can be made relatively thin, accurate shaping is obtained in fabrication, and surface properties such as surface roughness of the center-side assist cam surface 60A is enhanced.

In the clutch device 10 according to this preferred embodiment, the first center-side recess 62 includes the first center-side slope 63 parallel or substantially parallel to the center-side assist cam surface 60A. In this configuration, the thickness of a portion including the center-side assist cam surface 60A can be made substantially uniform, and thus, performance of the center-side assist cam surface 60A is enhanced.

In the clutch device 10 according to this preferred embodiment, the clutch center 40 is configured to rotate in the first circumferential direction S1 that is a direction from the center-side assist cam surface 60A of one center-side cam portion 60 to the center-side slipper cam surface 60S, and the first center-side slope 63 tilts to gradually approach the second direction D2 in the second circumferential direction S2. In this configuration, even in a case where clutch oil is accumulated in the first center-side recess 62, clutch oil accumulated in the first center-side recess 62 flows out in the second circumferential direction S2 along the first center-side slope 63.

In the clutch device 10 according to this preferred embodiment, when seen in the axial direction of the output shaft 15 (i.e., directions D), at least a portion of the second center-side recess 64 overlaps with the center-side slipper cam surface 60S. In this configuration, since a portion including the center-side slipper cam surface 60S can be made relatively thin, accurate shaping is obtained in fabrication, and surface properties such as surface roughness of the center-side slipper cam surface 60S is enhanced.

In the clutch device 10 according to this preferred embodiment, the second center-side recess 64 includes the second center-side slope 65 parallel or substantially parallel to the center-side slipper cam surface 60S. In this configuration, the thickness of a portion including the center-side slipper cam surface 60S can be made substantially uniform, and thus, performance of the center-side slipper cam surface 60S is enhanced.

In the clutch device 10 according to this preferred embodiment, the clutch center 40 includes the peripheral wall 45 located radially outward of the center-side cam portions 60, and the oil passage 53 penetrating the peripheral wall 45 and having one end open radially inward and communicate with the second center-side recess 64 and the other end open radially outward and communicate with the outside of the peripheral wall 45. In this configuration, clutch oil that has flowed out of the output shaft 15 into the second center-side recess 64 from the side of the clutch center 40 in the first direction D1 can be supplied to the output-side rotating plates 22 and the input-side rotating plates 20 through the oil passage 53.

In the clutch device 10 according to this preferred embodiment, the oil passage 53 is formed in the spline grooves 48 to penetrate the peripheral wall 45. In this configuration, since clutch oil flows along the spline grooves, clutch oil can be supplied to the output-side rotating plates 22 and the input-side rotating plates 20 in a balanced manner.

In the clutch device 10 according to this preferred embodiment, when seen in the axial direction of the output shaft 15 (i.e., directions D), the first center-side recess 62 and the second center-side recess 64 do not overlap each other. In this configuration, even when the depth of the first center-side recess 62 and the depth of the second center-side recess 64 in the axial direction of the output shaft 15 are increased, these recesses do not interfere with each other, and thus, the weight of the center-side cams portion 60 can be further reduced by relatively increasing the depths of the first center-side recess 62 and the second center-side recess 64.

In the clutch device 10 according to this preferred embodiment, at least one of the pressure-side cam portions 90 includes at least one of the first pressure-side recess 92 that is recessed in the second direction D2 from the surface 90D1 of the pressure-side cam portion 90 at the side of the first direction D1 or the second pressure-side recess 94 that is recessed in the first direction D1 from the surface 90DS of the pressure-side cam portion 90 at the side of the second direction D2. In this manner, since at least one of the pressure-side cam portion 90 includes at least one of the first pressure-side recess 92 or the second pressure-side recess 94, the pressure-side cam portion 90 is more lightweight than those not including these recesses. Since the clutch device 10 includes the more lightweight pressure plate 70, weight reduction of the entire clutch device 10 is achieved.

In the clutch device 10 according to this preferred embodiment, at least one of the pressure-side cam portions 90 includes the first pressure-side recess 92 and the second pressure-side recess 94. In this configuration, the weight of the pressure-side cam portions 90 is further reduced.

In the clutch device 10 according to this preferred embodiment, the pressure plate 70 includes the spring housing portion 84 recessed in the pressure-side cam portion 90 from the second direction D2 to the first direction D1 and housing the pressure spring 25 that biases the pressure plate 70 in the first direction D1, and the spring housing portion 84 is located between the first pressure-side recess 92 and the second pressure-side recess 94. In this configuration, the weight of the pressure-side cam portions 90 is further reduced.

In the clutch device 10 according to this preferred embodiment, the end 92A of the first pressure-side recess 92 in the second direction D2 may be located ahead, in the second direction D2, of the end 94A of the second pressure-side recess 94 in the first direction D1. In this configuration, the weight of the pressure-side cam portions 90 is further reduced.

In the clutch device 10 according to this preferred embodiment, the clutch center 40 includes the output shaft holding portion 50 to which the output shaft 15 is coupled, and the center-side fitting portion 58 located radially outward of the output shaft holding portion 50, the pressure plate 70 includes the pressure-side fitting portion 88 located radially outward of the pressure-side cam portions 90 and slidably fitted in the center-side fitting portion 58, and the end 94A of the second pressure-side recess 94 in the first direction D1 is located ahead, in the first direction D1, of the end 88A of the pressure-side fitting portion 88 in the first direction D1. In this configuration, the weight of the pressure-side cam portions 90 is further reduced.

In the clutch device 10 according to this preferred embodiment, when seen in the axial direction of the output shaft 15 (i.e., directions D), at least a portion of the first pressure-side recess 92 overlaps with the pressure-side assist cam surface 90A. In this configuration, since a portion including the pressure-side assist cam surface 90A can be made relatively thin, accurate shaping is obtained in fabrication, and surface properties such as surface roughness of the pressure-side assist cam surface 90A is enhanced.

In the clutch device 10 according to this preferred embodiment, the first pressure-side recess 92 includes the first pressure-side slope 93 parallel or substantially parallel to the pressure-side assist cam surface 90A. In this configuration, the thickness of a portion including the pressure-side assist cam surface 90A can be made substantially uniform, and thus, performance of the pressure-side assist cam surface 90A is enhanced.

In the clutch device 10 according to this preferred embodiment, when seen in the axial direction of the output shaft 15 (i.e., directions D), at least a portion of the second pressure-side recess 94 overlaps with the pressure-side slipper cam surface 90S. In this configuration, since a portion including the pressure-side slipper cam surface 90S can be made relatively thin, accurate shaping is obtained in fabrication, and surface properties such as surface roughness of the pressure-side slipper cam surface 90S is enhanced.

In the clutch device 10 according to this preferred embodiment, the second pressure-side recess 94 includes the second pressure-side slope 95 parallel or substantially parallel to the pressure-side slipper cam surface 90S. In this configuration, the thickness of a portion including the pressure-side slipper cam surface 90S can be made substantially uniform, and thus, performance of the pressure-side slipper cam surface 90S is enhanced.

In the clutch device 10 according to this preferred embodiment, when seen in the axial direction of the output shaft 15 (i.e., directions D), the first pressure-side recess 92 and the second pressure-side recess 94 do not overlap with each other. In this configuration, even when the depth of the first pressure-side recess 92 and the depth of the second pressure-side recess 94 in the axial direction of the output shaft 15 are increased, these recesses do not interfere with each other, and thus, the weight of the pressure-side cam portions 90 can be further reduced by relatively increasing the depths of the first pressure-side recess 92 and the second pressure-side recess 94.

In the clutch device 10 according to this preferred embodiment, when seen in the axial direction of the output shaft 15 (i.e., directions D), the second pressure-side recess 94 of the pressure plate 70 and the first center-side recess 62 of the clutch center 40 do not overlap with each other. In this configuration, clutch oil spattered from the second direction D2 toward the pressure plate 70 easily flows into the second pressure-side recess 94 and the first center-side recess 62. Clutch oil that has flowed into the second pressure-side recesses 94 and the first center-side recesses 62 flows out of the second pressure-side recesses 94 and the first center-side recesses 62 upon a shift of rotation of the engine, for example, and is supplied to the pressure-side assist cam surfaces 90A of the pressure-side cam portions 90, the center-side assist cam surfaces 60A of the center-side cam portions 60, and other portions. Accordingly, the pressure-side assist cam surfaces 90A, the center-side assist cam surfaces 60A, and other portions can be smoothly lubricated.

In the clutch device 10 according to this preferred embodiment, when seen in the axial direction of the output shaft 15 (i.e., directions D), at least a portion of the first center-side recess 62 overlaps with the pressure-side cam hole 73H. In this configuration, clutch oil spattered from the second direction D2 toward the pressure plate 70 easily flows into the first center-side recess 62 through the pressure-side cam hole 73H. Clutch oil that has flowed into the first center-side recesses 62 flows out of the first center-side recesses 62 upon a shift of rotation of the engine, for example, and is supplied to the pressure-side assist cam surfaces 90A of the pressure-side cam portions 90, the center-side assist cam surfaces 60A of the center-side cam portions 60, and other portions. Accordingly, the pressure-side assist cam surfaces 90A, the center-side assist cam surfaces 60A, and other portions can be smoothly lubricated.

In the clutch device 10 according to this preferred embodiment, when seen in the axial direction of the output shaft 15 (i.e., directions D), the first pressure-side recess 92 of the pressure plate 70 and the second center-side recess 64 of the clutch center 40 do not overlap with each other. In this configuration, clutch oil spattered from the first direction D1 toward the clutch center 40 easily flows into the first pressure-side recess 92 and the second center-side recess 64. Clutch oil that has flowed into the first pressure-side recesses 92 and the second center-side recesses 64 flows out of the first pressure-side recesses 92 and the second center-side recesses 64 upon a shift of rotation of the engine, for example, and is supplied to the pressure-side assist cam surfaces 90A of the pressure-side cam portions 90, the center-side assist cam surfaces 60A of the center-side cam portions 60, and other portions. Accordingly, the pressure-side assist cam surfaces 90A, the center-side assist cam surfaces 60A, and other portions can be smoothly lubricated.

In the clutch device 10 according to this preferred embodiment, when seen in the axial direction of the output shaft 15 (i.e., directions D), at least a portion of the first pressure-side recess 92 overlaps with the center-side cam hole 43H. In this configuration, clutch oil spattered from the first direction D1 toward the clutch center 40 easily flows into the first pressure-side recess 92 through the center-side cam hole 43H. Clutch oil that has flowed into the first pressure-side recesses 92 flows out of the first pressure-side recesses 92 upon a shift of rotation of the engine, for example, and is supplied to the pressure-side assist cam surfaces 90A of the pressure-side cam portions 90, the center-side assist cam surfaces 60A of the center-side cam portions 60, and other portions. Accordingly, the pressure-side assist cam surfaces 90A, the center-side assist cam surfaces 60A, and other portions can be smoothly lubricated.

Second Preferred Embodiment

Figure 16:
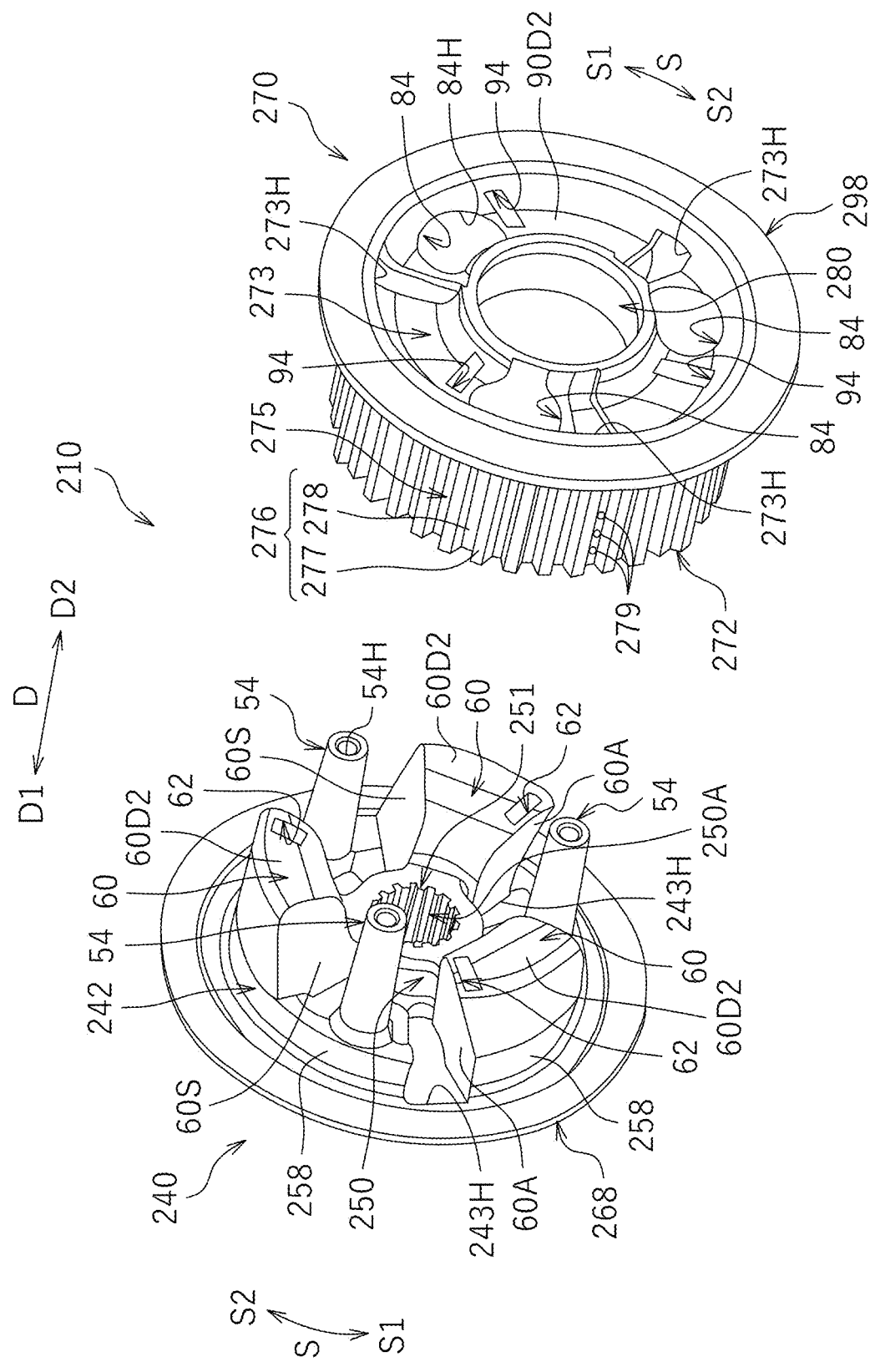
FIG. 16 is a disassembled perspective view of a clutch center and a pressure plate according to another preferred embodiment of the present invention.

FIG. 16 is a disassembled perspective view of a clutch center 240 and a pressure plate 270 of a clutch device 210 according to a second preferred embodiment.

The clutch center 240 is housed in a clutch housing 30 (see FIG. 1). The clutch center 240 and the clutch housing 30 are concentrically disposed. As illustrated in FIG. 16, the clutch center 240 includes a body 242, and a flange 268 connected to an outer edge of the body 242 on the side of a first direction D1 and extending radially outward. The body 242 projects from the flange 268 in a second direction D2. The clutch center 240 does not hold output-side rotating plates 22. The clutch center 240 is rotationally driven together with an output shaft 15 (see FIG. 1).

As illustrated in FIG. 16, the body 242 includes an output shaft holding portion 250, a plurality of center-side cam portions 60, and a center-side fitting portion 258. The center-side cam portions 60 project from the flange 268 in the second direction D2. The center-side cam portions 60 are located radially outward of the output shaft holding portion 250.

The output shaft holding portion 250 has a cylindrical shape. The output shaft holding portion 250 has an insertion hole 251 in which the output shaft 15 (see FIG. 1) is inserted and spline-fitted. The insertion hole 251 penetrates the body 242. An inner peripheral surface 250A of the output shaft holding portion 250 defining the insertion hole 251 has a plurality of spline grooves along the axial direction. The output shaft 15 is coupled to the output shaft holding portion 250.

As illustrated in FIG. 16, the clutch center 240 includes a plurality of (for example, three in this preferred embodiment) bosses 54. The bosses 54 are located radially outward of the output shaft holding portion 250. The bosses 54 are disposed on the body 242.

Figure 17:
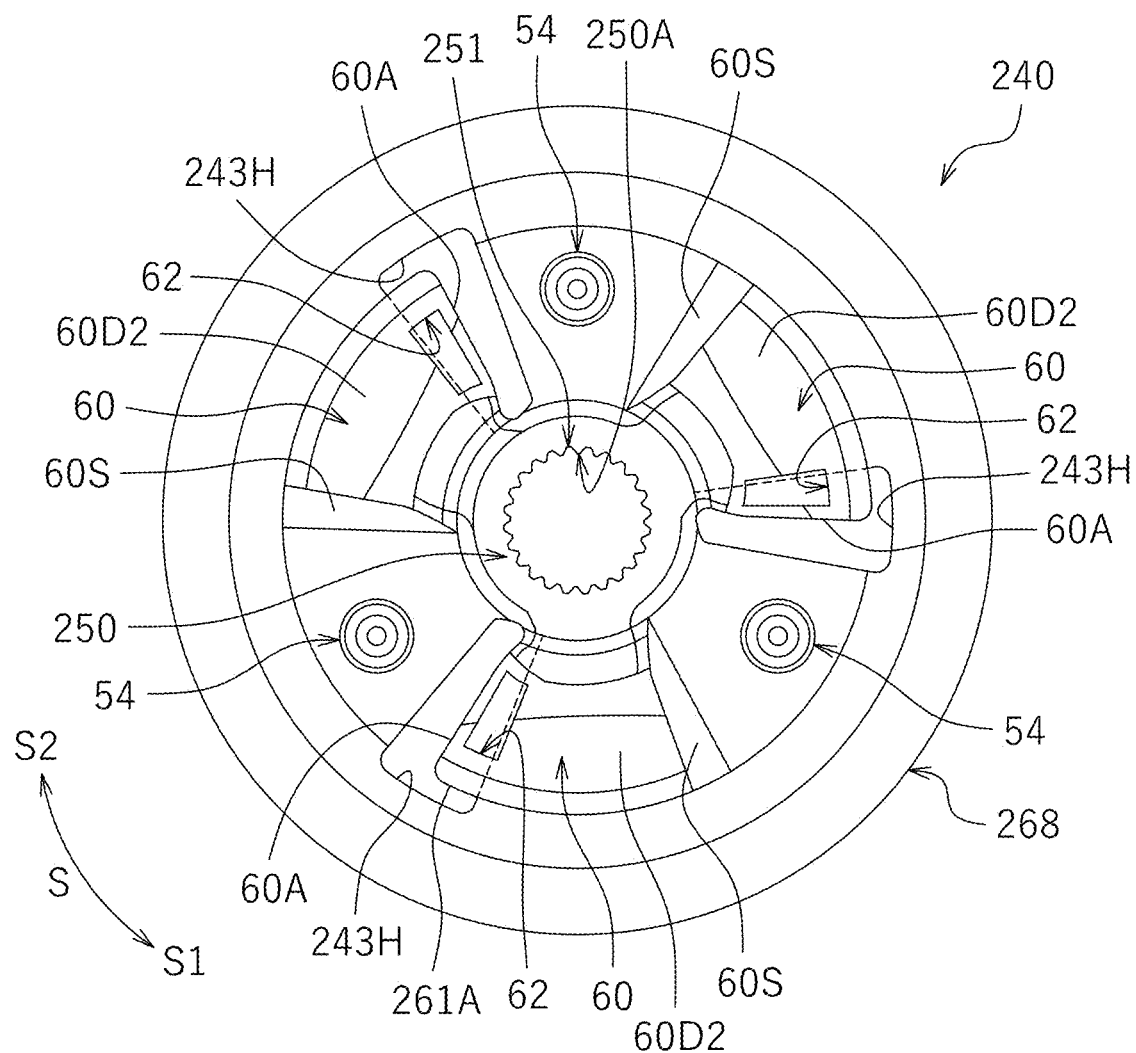
FIG. 17 is a plan view of a clutch center according to another preferred embodiment of the present invention.

As illustrated in FIG. 16, the clutch center 240 includes center-side cam holes 243H penetrating the body 242 and a portion of the flange 268. The center-side cam holes 243H penetrate the body 242 and the flange 268 in directions D. The center-side cam holes 243H are located radially outward of the output shaft holding portion 250. As illustrated in FIG. 17, the center-side cam holes 243H extend from portions on the side of the output shaft holding portion 250 to the flange 268. Each of the center-side cam holes 243H is located between adjacent ones of the center-side cam portions 60. The center-side cam holes 243H are formed between the center-side assist cam surfaces 60A of the center-side cam portions 60 and the bosses 54. When seen in the axial direction of the clutch center 240, the center-side assist cam surfaces 60A overlap with a portion of the center-side cam holes 243H.

As illustrated in FIG. 16, the center-side fitting portion 258 is disposed on the body 242. The center-side fitting portion 258 is disposed radially outward of the center-side cam portions 60. The center-side fitting portion 258 is located ahead of the center-side cam portions 60 in the first direction D1. The center-side fitting portion 258 is configured to slidably fit in the pressure-side fitting portion 288 (see FIG. 18).

As illustrated in FIG. 16, each of the center-side cam portions 60 includes a first center-side recess 62 that is recessed in the first direction D1 from a surface 60D2 of the center-side cam portion 60 at the side of the second direction D2. The first center-side recess 62 is located ahead of the center-side slipper cam surface 60S in a second circumferential direction S2. As illustrated in FIG. 17, when seen in the axial directions (i.e., directions D) of the output shaft 15, at least a portion of the first center-side recess 62 overlaps with the center-side assist cam surface 60A. When seen in the axial direction of the output shaft 15 (i.e., directions D), for example, at least about one half of the first center-side recess 62 overlaps with the center-side assist cam surface 60A with respect to circumferential directions S. When seen in the axial direction of the output shaft 15 (i.e., directions D), for example, at least about one half of the first center-side recess 62 overlaps with a center-side cam hole 243H with respect to the circumferential directions S.

The pressure plate 270 is movable toward or away from the clutch center 240 and rotatable relative to the clutch center 240. The pressure plate 270 is configured to press input-side rotating plates 20 and the output-side rotating plates 22. The pressure plate 270 is disposed coaxially with the clutch center 240 and the clutch housing 30. The pressure plate 270 includes a cylindrical body 272, and a flange 298 extending radially outward from the outer edge of the body 272. The pressure plate 270 holds the plurality of output-side rotating plates 22 alternately arranged with the input-side rotating plates 20 in the directions D. In this preferred embodiment, the pressure plate 270 holds all the output-side rotating plates 22.

Figure 18:
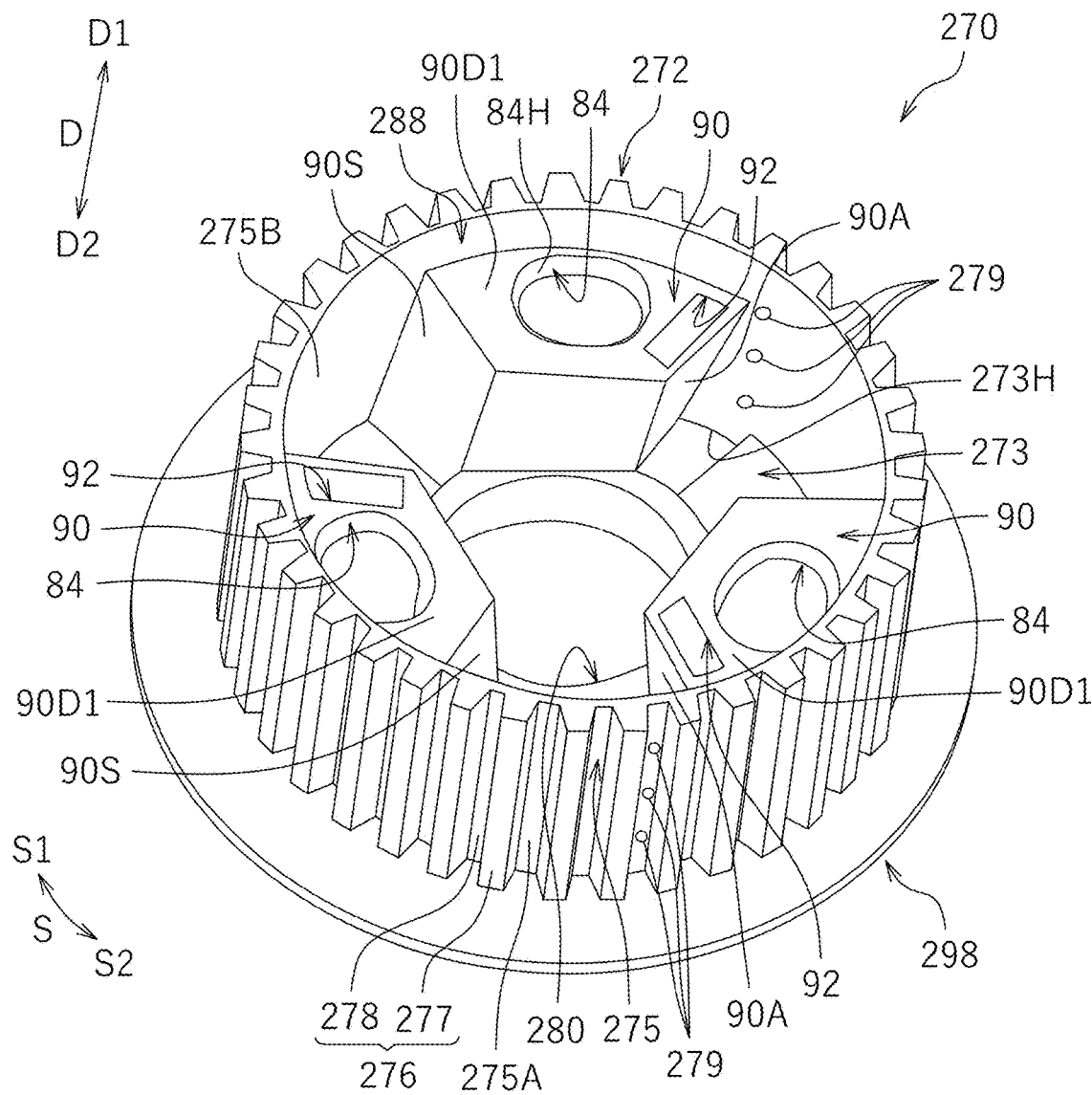
FIG. 18 is a perspective view of a pressure plate according to another preferred embodiment of the present invention.

As illustrated in FIG. 18, the body 272 includes a ring-shaped base wall 273, an outer peripheral wall 275 located radially outward of the base wall 273 and extending in the first direction D1, a cylindrical portion 280 disposed at the center of the base wall 273, a plurality of pressure-side cam portions 90 connected to the base wall 273 and the outer peripheral wall 275, a pressure-side fitting portion 288, and a spring housing portion 84 (see FIG. 16). The pressure-side cam portions 90 project from the body 272 in the first direction D1. The pressure-side cam portions 90 are located radially outward of the cylindrical portion 280. The pressure-side cam portions 90 are located radially inward of the outer peripheral wall 275.

The cylindrical portion 280 has a cylindrical shape. The cylindrical portion 280 is formed integrally with the pressure-side cam portions 90. The cylindrical portion 280 houses a distal end 15T of the output shaft 15 (see FIG. 1). The cylindrical portion 280 houses a release bearing 18 (see FIG. 1). The cylindrical portion 280 receives a pressing force from a push member 16B. The cylindrical portion 280 receives clutch oil that has flowed out from the distal end 15T of the output shaft 15.

As illustrated in FIG. 18, the outer peripheral wall 275 of the pressure plate 270 is located radially outward of the cylindrical portion 280. The outer peripheral wall 275 has a ring shape extending in the directions D. An outer peripheral surface 275A of the outer peripheral wall 275 has a spline fitting portion 276. The spline fitting portion 276 includes a plurality of pressure-side fitting teeth 277 extending in the axial direction of the pressure plate 270 along the outer peripheral surface 275A of the outer peripheral wall 275, a plurality of spline grooves 278 each formed between adjacent ones of the pressure-side fitting teeth 277 and extending in the axial direction of the pressure plate 270, and oil flow holes 279. The pressure-side fitting teeth 277 hold the output-side rotating plates 22. The plurality of pressure-side fitting teeth 277 are arranged in the circumferential directions S. The plurality of pressure-side fitting teeth 277 are arranged at regular or substantially regular intervals in the circumferential directions S. The plurality of pressure-side fitting teeth 277 have the same or substantially the same shape. The pressure-side fitting teeth 277 project radially outward from the outer peripheral surface 275A of the outer peripheral wall 275. The oil flow holes 279 penetrate the outer peripheral wall 275 in the radial directions. Each of the oil flow holes 279 is formed between adjacent ones of the pressure-side fitting teeth 277. That is, the oil flow holes 279 are formed in the spline grooves 278. The oil flow holes 279 are formed at the sides of the pressure-side cam portions 90. The oil flow holes 279 are formed at the sides of pressure-side assist cam surfaces 90A of the pressure-side cam portions 90. The oil flow holes 279 are located ahead of the pressure-side assist cam surfaces 90A in the first circumferential direction S1. The oil flow holes 279 are located ahead of pressure-side slipper cam surfaces 90S in the second circumferential direction S2. In this preferred embodiment, three oil flow holes 279 are formed in each of three portions of the peripheral wall 275 in the circumferential directions S. The oil flow holes 279 are arranged at regular or substantially intervals in the circumferential directions S. The oil flow holes 279 cause the inside and outside of the pressure plate 270 with each other. The oil flow holes 279 allow clutch oil that has flowed out of the output shaft 15 into the pressure plate 270 to be discharged to the outside of the pressure plate 270. In this preferred embodiment, the oil flow holes 279 allow clutch oil flowing at an inner peripheral surface 275B of the peripheral wall 275 to be discharged to the outside of the pressure plate 270. At least a portion of the oil flow holes 279 is located at a position facing the center-side fitting portion 258 (see FIG. 16).

The output-side rotating plates 22 are held by the spline fitting portion 276 of the pressure plate 270. The output-side rotating plates 22 are held by the pressure-side fitting teeth 277 and the spline grooves 278 by spline-fitting. The output-side rotating plates 22 are displaceable along the axial direction of the pressure plate 270. The output-side rotating plates 22 are rotatable together with the pressure plate 270.

As illustrated in FIGS. 16 and 18, the pressure plate 270 includes pressure-side cam holes 273H penetrating a portion of the base wall 273. The pressure-side cam holes 273H penetrate the base wall 273 in the directions D. The pressure-side cam holes 273H are located radially outward of the cylindrical portion 80. The pressure-side cam holes 273H extend from the sides of the cylindrical portion 80 to the outer peripheral wall 275. Each of the pressure-side cam holes 273H penetrates a portion between adjacent ones of the pressure-side cam portions 90. Each of the pressure-side cam holes 273H penetrates a portion between the pressure-side assist cam surface 90A and the pressure-side slipper cam surface 90S of adjacent ones of the pressure-side cam portions 90. When seen in the axial direction of the pressure plate 270, the pressure-side assist cam surfaces 90A overlap with a portion of the pressure-side cam holes 273H. Clutch oil flows into the pressure-side cam holes 273H from the outside of the pressure plate 270.

As illustrated in FIG. 18, the pressure-side fitting portion 288 is located radially outward of the cylindrical portion 280. The pressure-side fitting portion 288 is located radially outward of the pressure-side cam portions 90. The pressure-side fitting portion 288 is located ahead of the pressure-side cam portions 90 in the first direction D1. The pressure-side fitting portion 288 is formed on the inner peripheral surface 275B of the peripheral wall 275. The pressure-side fitting portion 288 is configured to slidably fit onto the center-side fitting portion 258 (see FIG. 16). A gap is formed between the pressure-side fitting portion 288 and the center-side fitting portion 258.

Figure 19:
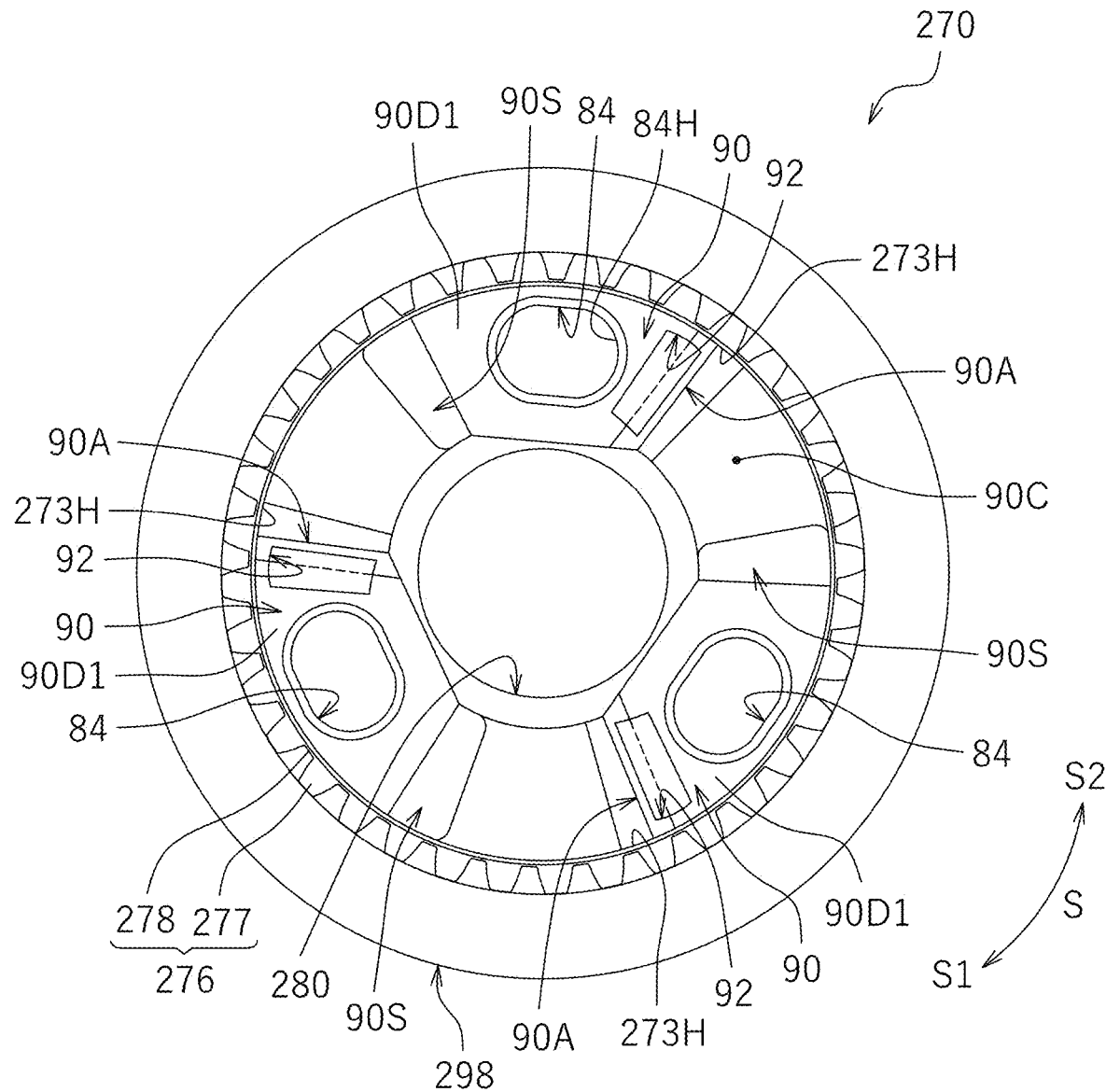
FIG. 19 is a plan view of a pressure plate according to another preferred embodiment of the present invention.

As illustrated in FIG. 18, each of the pressure-side cam portions 90 includes a first pressure-side recess 92 that is recessed in the second direction D2 from a surface 90D1 of the pressure-side cam portion 90 at the side of the first direction D1. The first pressure-side recess 92 is located ahead of the pressure-side slipper cam surface 90S in the first circumferential direction S1. As illustrated in FIG. 19, when seen in the axial direction of the output shaft 15 (i.e., directions D), at least a portion of the first pressure-side recess 92 overlaps with the pressure-side assist cam surface 90A.

As illustrated in FIG. 16, the pressure-side cam portion 90 includes a second pressure-side recess 94 that is recessed in the first direction D1 from a surface 90D2 of the pressure-side cam portion 90 at the side of the second direction D2. The second pressure-side recess 94 is located ahead of the pressure-side assist cam surface 90A in the second circumferential direction S2. When seen in the axial direction of the output shaft 15 (i.e., directions D), at least a portion of the second pressure-side recess 94 overlaps with the pressure-side slipper cam surface 90S.

The foregoing description is directed to the preferred embodiments of the present disclosure. The preferred embodiments described above, however, are merely examples, and the present disclosure can be performed in various modes and through various preferred embodiments.

In the first preferred embodiment described above, each of the center-side cam portions 60 includes the first center-side recess 62 and the second center-side recess 64, but may include at least one of the first center-side recess 62 or the second center-side recess 64. In the first preferred embodiment, all of the center-side cam portions 60 include the first center-side recess 62 and the second center-side recess 64, but at least one of the center-side cam portions 60 may include at least one of the first center-side recess 62 or the second center-side recess 64. In the second preferred embodiment, each of the center-side cam portions 60 may include the second center-side recess 64. In the second preferred embodiment, all of the center-side cam portions 60 include the first center-side recess 62, but at least one of the center-side cam portions 60 may include at least one of the first center-side recess 62 or the second center-side recess 64. In the first preferred embodiment and the second preferred embodiment, each of the pressure-side cam portions 90 includes the first pressure-side recess 92 and the second pressure-side recess 94, but may include at least one of the first pressure-side recess 92 or the second pressure-side recess 94. In the first preferred embodiment and the second preferred embodiment, all of the pressure-side cam portions 90 include the first pressure-side recess 92 and the second pressure-side recess 94, but at least one of the pressure-side cam portions 90 may include at least one of the first pressure-side recess 92 or the second pressure-side recess 94.

The shapes of the first center-side recess 62, the second center-side recess 64, the first pressure-side recess 92, and the second pressure-side recess 94 are not specifically limited. These shapes may be circular, oval, or rectangular, for example.

In the preferred embodiments described above, at least one of the center-side cam portions 60 includes the center-side assist cam surface 60A and the center-side slipper cam surface 60S, but only needs to include at least the center-side assist cam surface 60A.

In the preferred embodiments described above, at least one of the pressure-side cam portions 90 includes the pressure-side assist cam surface 90A and the pressure-side slipper cam surface 90S, but only needs to include at least the pressure-side assist cam surface 90A.

Figure 20:
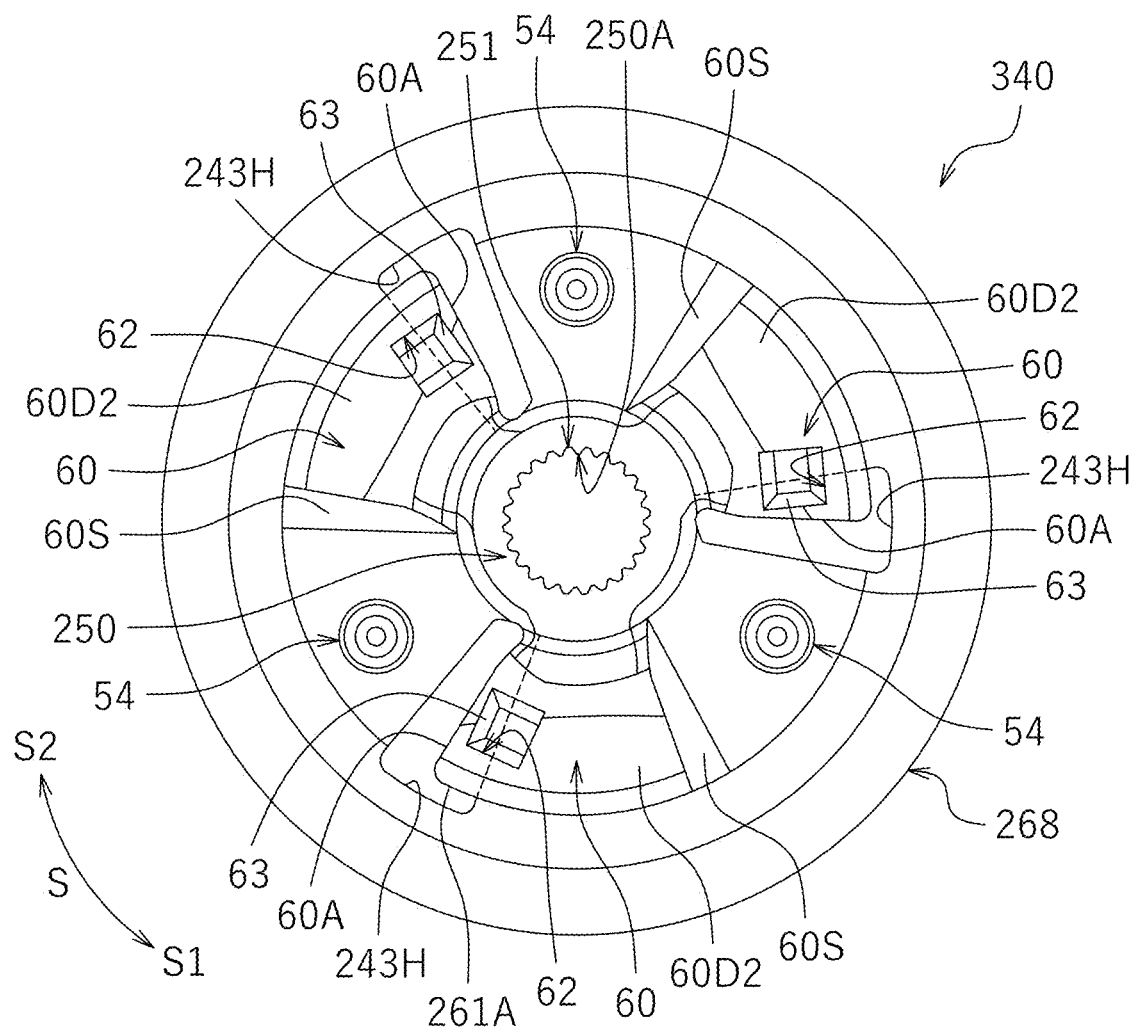
FIG. 20 is a plan view of a clutch center according to a variation of a preferred embodiment of the present invention.

In the preferred embodiments described above, when seen in the axial direction of the output shaft 15 (i.e., directions D), for example, at least about one half of the first center-side recess 62 overlaps with the center-side assist cam surface 60A with respect to the circumferential directions S, but the present disclosure is not limited to these preferred embodiments. For example, as illustrated in FIG. 20, for example, at least about one half of the first center-side recess 62 of a clutch center 340 may be located closer to the center-side slipper cam surface 60S than the center-side assist cam surface 60A with respect to the circumferential direction S, when seen in the axial direction of the output shaft 15 (i.e., directions D). In FIG. 20, the first center-side recess 62 includes the first center-side slope 63 parallel or substantially parallel to the center-side assist cam surface 60A. The first center-side slope 63 tilts to gradually approach the second direction D2 in the second circumferential direction S2. When seen in the axial direction of the output shaft 15 (i.e., directions D), the first center-side slope 63 overlaps with the center-side assist cam surface 60A. In this example, all the first center-side slopes 63 overlap with the center-side assist cam surfaces 60A.

In the second preferred embodiment described above, the clutch center 240 is configured not to hold the output-side rotating plates 22, but the present disclosure is not limited to this preferred embodiment. The clutch center 240 may include center-side fitting teeth having a configuration similar to that of the pressure-side fitting teeth 77 of the first preferred embodiment capable of holding the output-side rotating plates 22.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device to allow or interrupt transfer of a rotation driving force of an input shaft to an output shaft, the clutch device comprising:
    a clutch center housed in a clutch housing holding a plurality of input-side rotating plates to be rotationally driven together with the output shaft, the input-side rotating plates being operable to be rotationally driven by rotational driving of the input shaft; and
    a pressure plate movable toward or away from the clutch center and rotatable relative to the clutch center to press the input-side rotating plates and output-side rotating plates, the input-side rotating plates and the output-side rotating plates being alternately arranged; wherein
    the pressure plate includes:
        a body; and
        a plurality of pressure-side cam portions, assuming a direction in which the pressure plate approaches the clutch center is a first direction, and a direction in which the pressure plate moves away from the clutch center is a second direction, each of the pressure-side cam portions projecting from a surface of the body at a side of the first direction in the first direction, being located radially outward of the output shaft, and including a pressure-side assist cam surface and a pressure-side slipper cam surface, the pressure-side assist cam surface being operable to generate a force in a direction of causing the pressure plate to approach the clutch center in order to increase a pressing force between the input-side rotating plates and the output-side rotating plates upon rotation relative to the clutch center, the pressure-side slipper cam surface being operable to cause the pressure plate to move away from the clutch center in order to reduce the pressing force between the input-side rotating plates and the output-side rotating plates upon rotation relative to the clutch center;
    at least one of the pressure-side cam portions includes a first pressure-side recess located between the pressure-side assist cam surface and the pressure-side slipper cam surface with respect to circumferential directions and recessed in the second direction from a surface of the pressure-side cam portion at a side of the first direction;
    an entire periphery of the first pressure-side recess is surrounded by the surface of the pressure-side cam portion at the side of the first direction, when seen in an axial direction of the output shaft; and
    the first pressure-side recess includes a peripheral portion parallel or substantially parallel to an edge of the pressure-side assist cam surface located at a distal end of the pressure-side assist cam surface in the circumferential directions, when seen in an axial direction of the output shaft.

2. The clutch device according to claim 1, wherein when seen in an axial direction of the output shaft, at least a portion of the first pressure-side recess overlaps with the pressure-side assist cam surface.

3. The clutch device according to claim 2, wherein the first pressure-side recess includes a first pressure-side slope parallel or substantially parallel to the pressure-side assist cam surface.

4. The clutch device according to claim 3, wherein assuming a direction from one pressure-side cam portion to another pressure-side cam portion in the pressure-side cam portions is a first circumferential direction and a direction from the another pressure-side cam portion to the one pressure-side cam portion is a second circumferential direction with respect to the circumferential directions, the pressure plate is operable to rotate in the first circumferential direction that is a direction from the pressure-side slipper cam surface to the pressure-side assist cam surface of one of the pressure-side cam portions; and
    the first pressure-side slope tilts to approach the first direction in the first circumferential direction.

5. The clutch device according to claim 1, wherein at least one of the pressure-side cam portions includes a second pressure-side recess, the second pressure-side recess being located between the pressure-side assist cam surface and the pressure-side slipper cam surface with respect to the circumferential directions and recessed in the first direction from a surface of the pressure-side cam portion at a side of the second direction; and
    when seen in an axial direction of the output shaft, at least a portion of the second pressure-side recess overlaps with the pressure-side slipper cam surface.

6. The clutch device according to claim 5, wherein the second pressure-side recess includes a second pressure-side slope parallel or substantially parallel to the pressure-side slipper cam surface.

7. The clutch device according to claim 6, wherein
assuming a direction from one pressure-side cam portion to another pressure-side cam portion in the pressure-side cam portions is a first circumferential direction and a direction from the another pressure-side cam portion to the one pressure-side cam portion is a second circumferential direction with respect to the circumferential directions, the pressure plate is operable to rotate in the first circumferential direction that is a direction from the pressure-side slipper cam surface to the pressure-side assist cam surface of one of the pressure-side cam portions; and
the second pressure-side slope tilts to approach the second direction in the second circumferential direction.

8. The clutch device according to claim 1, wherein
at least one of the pressure-side cam portions includes a second pressure-side recess, the second pressure-side recess being located between the pressure-side assist cam surface and the pressure-side slipper cam surface with respect to the circumferential directions and recessed in the first direction from a surface of the pressure-side cam portion at a side of the second direction; and
the clutch center includes:
    an output shaft holding portion to which the output shaft is coupled; and
    a plurality of center-side cam portions located radially outward of the output shaft holding portion and each including a center-side assist cam surface operable to generate a force in a direction of causing the pressure plate to approach the clutch center in order to increase a pressing force between the input-side rotating plates and the output-side rotating plates upon rotation relative to the pressure plate;
at least one of the center-side cam portions includes a first center-side recess and a second center-side recess, the first center-side recess being recessed in the first direction from a surface of the center-side cam portion at a side of the second direction, the second center-side recess being recessed in the second direction from a surface of the center-side cam portion at a side of the first direction; and
when seen in an axial direction of the output shaft, the second pressure-side recess of the pressure plate and the first center-side recess of the clutch center do not overlap with each other.

9. The clutch device according to claim 1, wherein
the pressure plate includes:
    a pressure-side cam hole penetrating a portion between adjacent ones of the pressure-side cam portions;
the clutch center includes:
    an output shaft holding portion to which the output shaft is coupled; and
    a plurality of center-side cam portions located radially outward of the output shaft holding portion and each including a center-side assist cam surface operable to generate a force in a direction of causing the pressure plate to approach the clutch center in order to increase a pressing force between the input-side rotating plates and the output-side rotating plates upon rotation relative to the pressure plate;
at least one of the center-side cam portions includes a first center-side recess that is recessed in the first direction from a surface of the center-side cam portion at a side of the second direction; and
when seen in an axial direction of the output shaft, at least a portion of the first center-side recess overlaps with the pressure-side cam hole.

10. The clutch device according to claim 1, wherein
the clutch center includes:
    an output shaft holding portion to which the output shaft is coupled;
    a plurality of center-side cam portions located radially outward of the output shaft holding portion and each including a center-side assist cam surface operable to generate a force in a direction of causing the pressure plate to approach the clutch center in order to increase a pressing force between the input-side rotating plates and the output-side rotating plates upon rotation relative to the pressure plate; and
    a center-side cam hole penetrating a portion between adjacent ones of the center-side cam portions;
when seen in an axial direction of the output shaft, at least a portion of the first pressure-side recess overlaps with the center-side cam hole.

11. The clutch device according to claim 1, wherein
the pressure-side cam portion includes a second pressure-side recess, the second pressure-side recess being located between the pressure-side assist cam surface and the pressure-side slipper cam surface with respect to the circumferential directions and recessed in the first direction from a surface of the pressure-side cam portion at a side of the second direction.

12. The clutch device according to claim 11, wherein
the pressure plate includes a spring housing portion recessed in the pressure-side cam portion from the second direction in the first direction and operable to bias the pressure plate in the first direction; and
the spring housing portion is located between the first pressure-side recess and the second pressure-side recess.

13. The clutch device according to claim 11, wherein an end of the first pressure-side recess in the second direction is located ahead, in the second direction, of an end of the second pressure-side recess in the first direction.

14. The clutch device according to claim 11, wherein
the clutch center includes:
    an output shaft holding portion to which the output shaft is coupled; and
    a center-side fitting portion located radially outward of the output shaft holding portion;
the pressure plate includes:
    a pressure-side fitting portion located radially outward of the pressure-side cam portions and operable to slidably fit in the center-side fitting portion; and
    an end of the second pressure-side recess in the first direction is located ahead, in the first direction, of an end of the pressure-side fitting portion in the first direction.

15. The clutch device according to claim 11, wherein when seen in an axial direction of the output shaft, the first pressure-side recess and the second pressure-side recess do not overlap with each other.

16. The clutch device according to claim 11, wherein
the clutch center includes:
    an output shaft holding portion to which the output shaft is coupled; and
    a plurality of center-side cam portions located radially outward of the output shaft holding portion and each including a center-side assist cam surface operable to generate a force in a direction of causing the pressure plate to approach the clutch center in order to increase a pressing force between the input-side rotating plates and the output-side rotating plates upon rotation relative to the pressure plate;

at least one of the center-side cam portions includes a first center-side recess and a second center-side recess, the first center-side recess being recessed in the first direction from a surface of the center-side cam portion at a side of the second direction, the second center-side recess being recessed in the second direction from a surface of the center-side cam portion at a side of the first direction; and when seen in an axial direction of the output shaft, the first pressure-side recess of the pressure plate and the second center-side recess of the clutch center do not overlap with each other.

17. The clutch device according to claim 1, wherein assuming a direction from one pressure-side cam portion to another pressure-side cam portion in the pressure-side cam portions is a first circumferential direction and a direction from the another pressure-side cam portion to the one pressure-side cam portion is a second circumferential direction with respect to the circumferential directions, the pressure plate is operable to rotate in the first circumferential direction that is a direction from the pressure-side slipper cam surface to the pressure-side assist cam surface of one of the pressure-side cam portions, and the first pressure-side recess includes a first pressure-side slope that tilts to approach the first direction in the first circumferential direction.

18. The clutch device according to claim 17, wherein the first pressure-side slope is parallel or substantially parallel to the pressure-side assist cam surface.

19. A clutch device to allow or interrupt transfer of a rotation driving force of an input shaft to an output shaft, the clutch device comprising:

a clutch center housed in a clutch housing holding a plurality of input-side rotating plates to be rotationally driven together with the output shaft, the input-side rotating plates being operable to be rotationally driven by rotational driving of the input shaft; and a pressure plate movable toward or away from the clutch center and rotatable relative to the clutch center to press the input-side rotating plates and output-side rotating plates, the input-side rotating plates and the output-side rotating plates being alternately arranged; wherein the clutch center includes:
an output shaft holding portion to which the output shaft is coupled; and
a boss located radially outward of the output shaft holding portion and extending toward the pressure plate;

the pressure plate includes:
a body;
a plurality of pressure-side cam portions, assuming a direction in which the pressure plate approaches the clutch center is a first direction, and a direction in which the pressure plate moves away from the clutch center is a second direction, each of the pressure-side cam portions projecting from a surface of the body at a side of the first direction in the first direction, being located radially outward of the output shaft, and including a pressure-side assist cam surface and a pressure-side slipper cam surface, the pressure-side assist cam surface being operable to generate a force in a direction of causing the pressure plate to approach the clutch center in order to increase a pressing force between the input-side rotating plates and the output-side rotating plates upon rotation relative to the clutch center, the pressure-side slipper cam surface being operable to cause the pressure plate to move away from the clutch center in order to reduce the pressing force between the input-side rotating plates and the output-side rotating plates upon rotation relative to the clutch center; and an insertion hole formed in the pressure-side cam portions and into which the boss is inserted;

at least one of the pressure-side cam portions includes a first pressure-side recess located between the pressure-side assist cam surface and the pressure-side slipper cam surface with respect to circumferential directions and recessed in the second direction from a surface of the pressure-side cam portion at a side of the first direction;

the first pressure-side recess is located on one side of the insertion hole in the circumferential directions; and an entire periphery of the first pressure-side recess is surrounded by the surface of the pressure-side cam portion at the side of the first direction, when seen in an axial direction of the output shaft.

20. A clutch device to allow or interrupt transfer of a rotation driving force of an input shaft to an output shaft, the clutch device comprising:

a clutch center housed in a clutch housing holding a plurality of input-side rotating plates to be rotationally driven together with the output shaft, the input-side rotating plates being operable to be rotationally driven by rotational driving of the input shaft; and a pressure plate movable toward or away from the clutch center and rotatable relative to the clutch center to press the input-side rotating plates and output-side rotating plates, the input-side rotating plates and the output-side rotating plates being alternately arranged; wherein the clutch center includes:
an output shaft holding portion to which the output shaft is coupled; and
a center-side fitting portion located radially outward of the output shaft holding portion;

the pressure plate includes:
a body;
a plurality of pressure-side cam portions, assuming a direction in which the pressure plate approaches the clutch center is a first direction, and a direction in which the pressure plate moves away from the clutch center is a second direction, each of the pressure-side cam portions projecting from a surface of the body at a side of the first direction in the first direction, being located radially outward of the output shaft, and including a pressure-side assist cam surface and a pressure-side slipper cam surface, the pressure-side assist cam surface being operable to generate a force in a direction of causing the pressure plate to approach the clutch center in order to increase a pressing force between the input-side rotating plates and the output-side rotating plates upon rotation relative to the clutch center, the pressure-side slipper cam surface being operable to cause the pressure plate to move away from the clutch center in order to reduce the pressing force between the input-side rotating plates and the output-side rotating plates upon rotation relative to the clutch center; and a pressure-side fitting portion located radially outward of the pressure-side cam portions and operable to slidably fit in the center-side fitting portion;

at least one of the pressure-side cam portions includes a first pressure-side recess located between the pressure-side assist cam surface and the pressure-side slipper cam surface with respect to circumferential directions and recessed in the second direction from a surface of the pressure-side cam portion at a side of the first direction and a second pressure-side recess located between the pressure-side assist cam surface and the pressure-side slipper cam surface with respect to circumferential directions and recessed in the first direction from a surface of the pressure-side cam portion at a side of the second direction;

an entire periphery of the first pressure-side recess is surrounded by the surface of the pressure-side cam portion at the side of the first direction, when seen in an axial direction of the output shaft; and an end of the second pressure-side recess in the first direction is located ahead, in the first direction, of an end of the pressure-side fitting portion in the first direction.

* * * * *